(12) United States Patent
Dolan et al.

(10) Patent No.: US 11,374,750 B2
(45) Date of Patent: Jun. 28, 2022

(54) KEY RECOVERY USING ENCRYPTED SECRET SHARES

(71) Applicant: tZERO IP, LLC, New York, NY (US)

(72) Inventors: Jonathan Dolan, Park City, UT (US); Michael D. Ornelas, Draper, UT (US); Kevin Hartley, Salt Lake City, UT (US); Pengyu Chen, Cottonwood Heights, UT (US); Juston Johnson, Salt Lake City, UT (US)

(73) Assignee: tZERO IP, LLC, New York, NY (US)

( * ) Notice: Subject to any disclaimer, the term of this patent is extended or adjusted under 35 U.S.C. 154(b) by 33 days.

(21) Appl. No.: 16/889,277

(22) Filed: Jun. 1, 2020

(65) Prior Publication Data
US 2020/0389306 A1  Dec. 10, 2020

Related U.S. Application Data

(60) Provisional application No. 62/931,753, filed on Nov. 6, 2019, provisional application No. 62/859,568, filed on Jun. 10, 2019.

(51) Int. Cl.
*H04L 9/08* (2006.01)
*H04L 9/14* (2006.01)
(Continued)

(52) U.S. Cl.
CPC .......... *H04L 9/0894* (2013.01); *H04L 9/0631* (2013.01); *H04L 9/085* (2013.01);
(Continued)

(58) Field of Classification Search
CPC ..... H04L 9/0894; H04L 9/0631; H04L 9/085; H04L 9/14; H04L 9/3026; H04L 9/3066; H04L 9/3252
See application file for complete search history.

(56) References Cited

U.S. PATENT DOCUMENTS 6,052,469 A * 4/2000 Johnson ................ H04L 9/0894
380/278
7,181,015 B2 * 2/2007 Matt ..................... H04L 9/0844
380/279
(Continued)

FOREIGN PATENT DOCUMENTS

WO     2019066822 A1    4/2019

OTHER PUBLICATIONS

"Chi Sing Chum", "Xinowen Zhang", "Hash function based secret sharing scheme designs", Nov. 2011, Computer Science Department, Graduate Center CUNY (Year: 2011).*

(Continued)

*Primary Examiner* — Darshan I Dhruv
(74) *Attorney, Agent, or Firm* — Fogg & Powers LLC

(57) ABSTRACT

A computing system comprising: processor(s) and memory; at least one network interface communicatively coupled to the at least one processor and configured to communicate with at least one remotely located computing device; wherein the at least one network interface is configured to receive a plurality of public encryption keys from the at least one remotely located computing device; wherein the at least one processor is configured to: split at least one secret into a plurality of shares, wherein at least a subset of the plurality of shares is sufficient to reconstruct the at least one secret; encrypt each of the plurality of shares based on a different public encryption key of the plurality of public encryption keys to create a plurality of encrypted shares; wherein the at least one network interface is configured to communicate the encrypted shares to the at least one remotely located computing device.

20 Claims, 12 Drawing Sheets

(51) Int. Cl.
    *H04L 9/32*     (2006.01)
    *H04L 9/06*     (2006.01)
    *H04L 9/30*     (2006.01)

(52) U.S. Cl.
    CPC .............. *H04L 9/14* (2013.01); *H04L 9/3026* (2013.01); *H04L 9/3066* (2013.01); *H04L 9/3252* (2013.01)

(56) References Cited

U.S. PATENT DOCUMENTS

| | | | |
|---|---|---|---|
| 10,084,600 B1* | 9/2018 | Irwan | H04L 63/0442 |
| 10,354,325 B1 | 7/2019 | Skala et al. | |
| 10,558,974 B2 | 2/2020 | Smith et al. | |
| 2010/0005302 A1 | 1/2010 | Vishnu et al. | |
| 2013/0013931 A1* | 1/2013 | O'Hare | H04L 9/085 713/189 |
| 2013/0212393 A1* | 8/2013 | D'Souza | H04L 63/0823 713/171 |
| 2014/0355757 A1 | 12/2014 | Shrivastava et al. | |
| 2017/0093564 A1* | 3/2017 | Bernat | H04L 9/085 |
| 2018/0205707 A1* | 7/2018 | Bellala | H04L 9/085 |
| 2018/0375653 A1* | 12/2018 | Setty | H04L 9/3218 |
| 2019/0220852 A1 | 7/2019 | Black et al. | |
| 2019/0342080 A1* | 11/2019 | Vakili | H04L 9/0825 |
| 2020/0052889 A1* | 2/2020 | Bendersky | H04L 9/0861 |
| 2020/0119917 A1* | 4/2020 | Christensen | H04L 9/30 |
| 2021/0105136 A1* | 4/2021 | Jäger | H04L 9/085 |
| 2021/0111875 A1* | 4/2021 | Le Saint | H04L 9/0869 |
| 2021/0264410 A1* | 8/2021 | Paek | H04L 9/0894 |

OTHER PUBLICATIONS

Vohra, "Coinsafe has zero knowledge of its users. Here's how.", Medium, Jan. 27, 2019, pp. 1 through 15, https://medium.com/coinsafeapp/coinsafe-has-zero-knowledge-of-its-users-heres-how-abb102fe2f97.

Vohra, "Introducing Coinsafe", Medium, Dec. 25, 2018, pp. 1 through 13, https://medium.com/coinsafeapp/introducing-coinsafe-never-lose-your-bitcoins-ever-cbf69bce9099.

International Searching Authority, "International Search Report and Written Opinion from PCT Application No. PCT/US2020/035543", from Foreign Counterpart to U.S. Appl. No. 16/889,277, filed Sep. 9, 2020, pp. 1 through 17, Published: WO.

U.S. Patent and Trademark Office, "Office Action", U.S. Appl. No. 16/250,369, filed Nov. 25, 2020, pp. 1 through 43, Published: US.

* cited by examiner

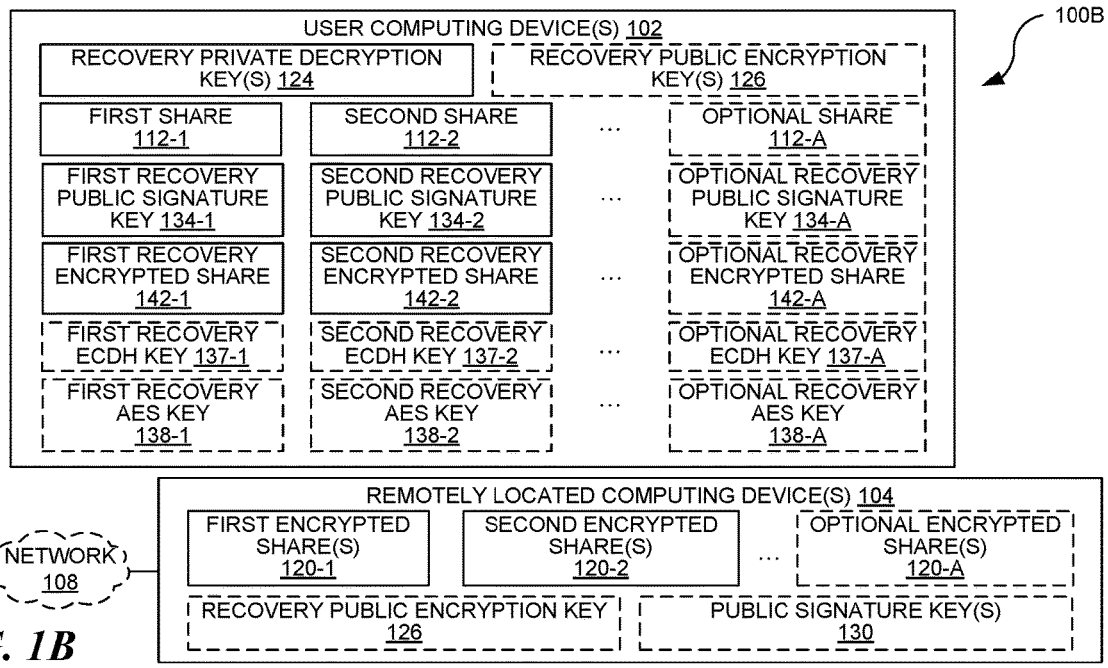
FIG. 1B
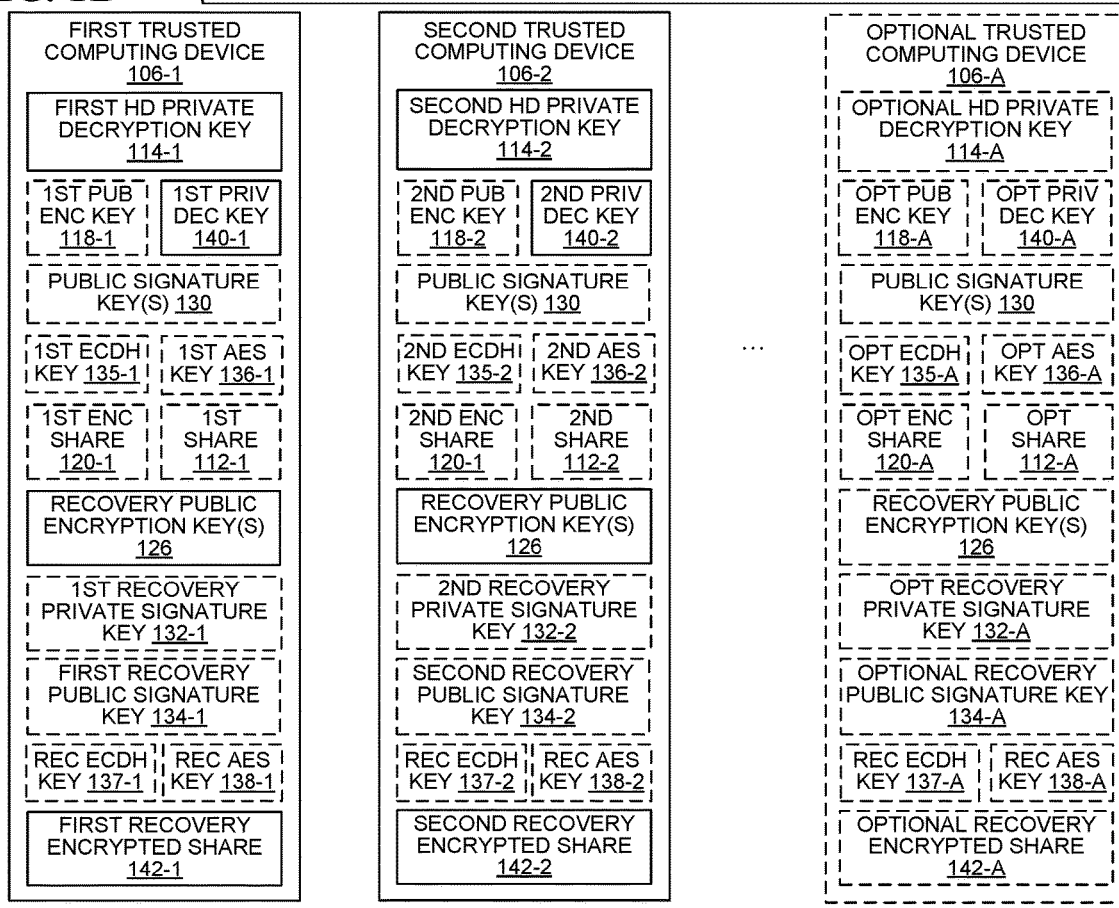

KEY RECOVERY USING ENCRYPTED SECRET SHARES

CROSS-REFERENCE TO RELATED APPLICATIONS

This application claims the benefit of U.S. Provisional Patent Application No. 62/859,568 filed on Jun. 10, 2019 and titled "KEY RECOVERY USING ENCRYPTED SECRET SHARES"; and U.S. Provisional Patent Application No. 62/931,753 filed on Nov. 6, 2019 and titled "KEY RECOVERY USING ENCRYPTED SECRET SHARES", the entirety of both of which are incorporated herein by reference.

BACKGROUND

Cryptography can be used to securely store and transmit data. Keys can be used to encrypt data and decrypt encrypted data.

SUMMARY

A computing system comprising: processor(s) and memory; at least one network interface communicatively coupled to the at least one processor and configured to communicate with at least one remotely located computing device; wherein the at least one network interface is configured to receive a plurality of public encryption keys from the at least one remotely located computing device; wherein the at least one processor is configured to: split at least one secret into a plurality of shares, wherein at least a subset of the plurality of shares is sufficient to reconstruct the at least one secret; encrypt each of the plurality of shares based on a different public encryption key of the plurality of public encryption keys to create a plurality of encrypted shares; wherein the at least one network interface is configured to communicate the encrypted shares to the at least one remotely located computing device.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1B is a block diagram illustrating an example system for secret recovery using encrypted secret shares;

Figure 1A:
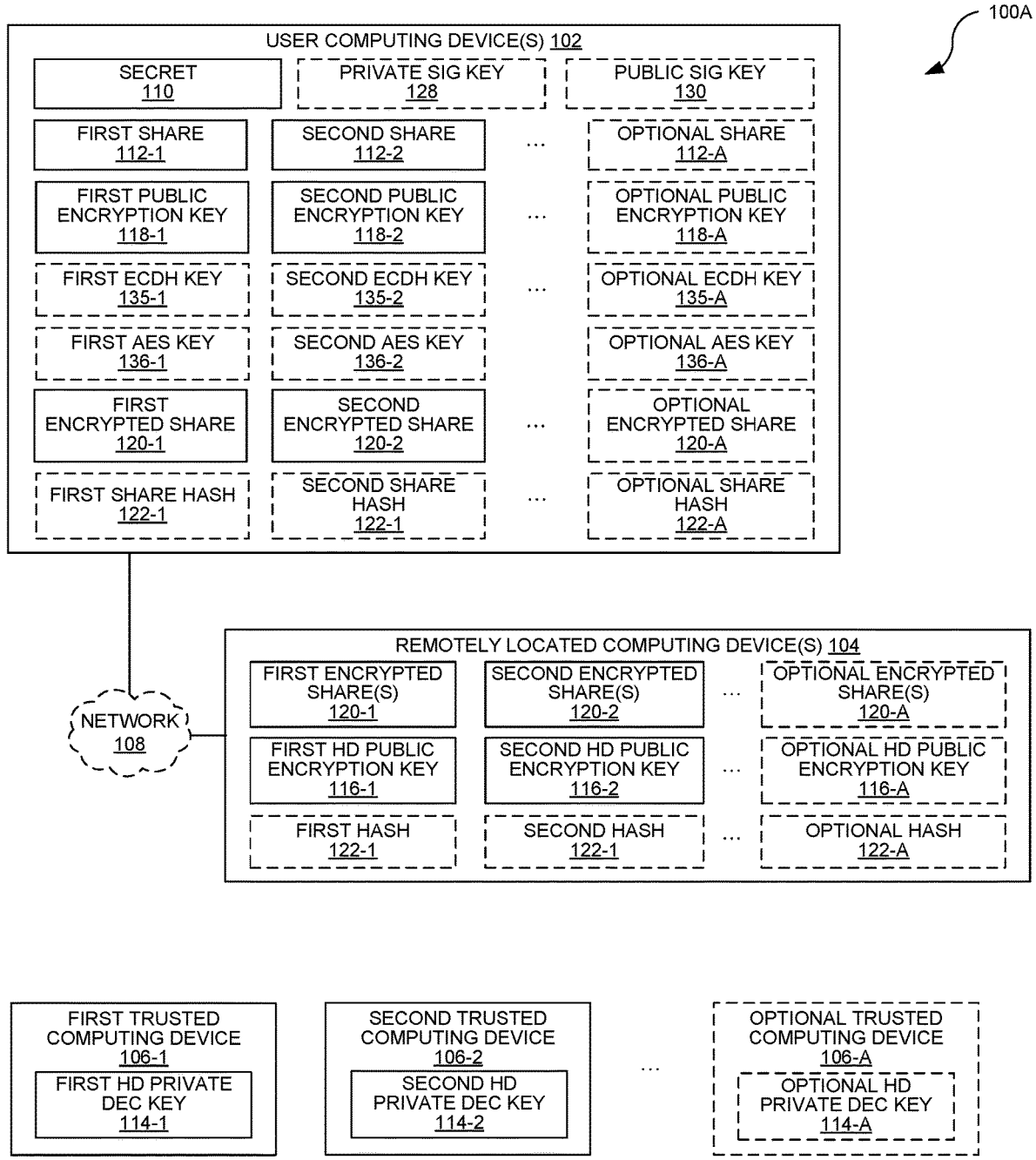
FIG. 1A is a block diagram illustrating an example system for encrypted secret backup using encrypted secret shares.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

Keys, including cryptographic keys, can be used to encrypt data, decrypt data, and sign transactions. Keys can include (but are not limited to) private keys, public keys, encryption keys, signature keys, and other cryptographic keys as well as passwords and secrets. One difficulty with keys is keeping them both secure and accessible when needed. In some instances, it is not desirable to have access to a wallet limited to a single person/entity because this may leave the wallet vulnerable to malicious attacks. Instead, it may be desirable to require verification from more than one person/entity to use a wallet.

In some configurations, one or more symmetric encryption keys may be used to perform symmetric encryption. A symmetric encryption key (or simply "symmetric key") may be used to encrypt and/or decrypt data. This is referred to as "symmetric" encryption/decryption because the same key can be used to encrypt and decrypt, e.g., to encrypt and decrypt one or more private keys for different blockchain addresses, accounts, and/or wallets. Without limitation, symmetric keys may operate according to any of the following encryption: Twofish, Serpent, Advanced Encryption Standard (AES), Blowfish, CAST5, Kuznyechik, RC4, Data Encryption Standard (DES), Triple DES (3DES), Skipjack, Safer+/++(Bluetooth), IDEA and/or other cypher block coding (CBC) variations. Accordingly, even though AES keys are used in some examples below, any other symmetric keys could alternatively be used.

In examples, symmetrically encrypting a secret part with an AES key includes applying at least one exclusive or (XOR) operation such that the resulting encrypted secret part includes a one in each bit position where bits in a corresponding bit position in both the secret part and the AES key are different; and the encrypted secret part includes a zero in each bit position where bits in a corresponding bit position in both the secret part and the AES key are the same.

In some configurations, asymmetric encryption may be used. A "public/private keypair," which includes a private key and a corresponding public key, may be used in asymmetric encryption. The private key and public key may alternatively be referred to as an decrypting private key and an encrypting public key. This may be referred to as "asymmetric" encryption/decryption because the same key is not used to encrypt and decrypt (or sign transactions). It is generally desirable to keep a private key (and sometimes the public key) secure. Without limitation, asymmetric keys may operate according to any of the following encryption: Rivest-Shamir-Adleman (RSA) and Elliptic Curve Cryptography (ECC) (e.g., Curve25519), Edwards-curve Digital Signature Algorithm (EdDSA) (e.g., Ed25519), etc.

In examples, a public key can be used to encrypt data, which can then be decrypted only using the private key corresponding to the public key that was used for encryption. In examples, a public key may be used to generate a transaction address (e.g., in a customer wallet), and only the corresponding private key can sign a transaction that spends funds from the transaction address.

A key may be split into multiple key components (i.e., shares) where at least a subset (or all) of the key components can be used to reconstruct the original key, i.e., key splitting. In examples, a particular quantity of key components may be required to reconstruct a particular key, e.g., M of M or M of N (where M<N). In examples, the key is split into the set of key components through at least one of polynomial interpolation or Shamir secret sharing.

In examples, keys and/or key components can be electronically distributed to the devices using at least one of email, Short Message Service (SMS), Multimedia Messaging Service (MMS), instant messaging, push notification (such as a push verify notification), by polling (or pulling) a notification, or by Bluetooth, Wi-Fi, or near field communication (NFC) transmission. In examples, the keys and/or key components can be displayed on a screen and written down or otherwise physically distributed through printing (such as into a Quick Response (QR) code, barcode, etc.) or stored on USB keys/memory sticks (or other solid state drives), or optical or magnetic disks. Additionally, an index of a key or a key component within a node tree may be communicated from a first device to a second device, which can derive the key or key component from a different key already stored at the second device, such as with a hierarchical deterministic (HD) key/wallet.

During routine operation, private keys may be required to decrypt and/or sign/transact from a customer wallet, e.g., to transfer cryptocurrency from a transaction address. If the user were to lose their private key (such as by losing, breaking, or upgrading their device that contained the private key), private keys can be recovered using methodologies described herein. While mnemonic phrases (such as a 12-word private key mnemonic) can be generated from the private key and backed up for use in recovering the private key, these can get lost and it is desirable to have additional ways of securely backing up the master key allowing it to be recovered. The description below describes ways of backing up and recovering secrets securely.

FIG. 1A is a block diagram illustrating an example system 100A for encrypted secret backup using encrypted secret shares 120. The system 100A includes user computing device(s) 102, remotely located computing device(s) 104, and trusted computing devices 106. The user computing device(s) 102 are communicatively coupled to the remotely located computing device(s) 104 through a network 108. In examples, the trusted computing devices 106 (such as first trusted computing device 106-1, second trusted computing device 106-2, and optional trusted computing device 106-A) are air-gapped computing devices, meaning that they are not networked with any other devices. In such examples, data can be communicated between the remotely located computing device(s) 104 and the trusted computing devices 106 using a mobile storage device, such as a USB drive, or by other suitable means. In examples, an operator shuttles data between the remotely located computing device(s) 104 and the first trusted computing device(s) 106. The system 100A may include more than one of the various devices.

Each of the user computing device 102, the remotely located computing device(s) 104, the trusted computing devices 106, and any other computing devices described herein may be implemented as any of a mobile computing device, such as a mobile phone, tablet computer, mobile media device, mobile gaming device, laptop computer, or vehicle-based computer, etc.; or a non-mobile computing device such as a dedicated terminal, a public terminal, a kiosk, a server, a cloud server, or a desktop computer. In examples, each of the user computing device 102, the remotely located computing device(s) 104, the trusted computing devices 106, and any other computing devices may include at least one memory, at least one processor, at least one optional network interface, at least one optional display device, at least one optional input device, and at least one optional power source. Additionally, each of the user computing device 102, the remotely located computing device(s) 104, the trusted computing devices 106, and any other computing devices can optionally be implemented using multiple physical devices.

The system 100A may use a multi-party key splitting methodology where a secret, such as a private key (e.g., a unique string of numbers, letters, and/or other characters), is split into two (or any suitable number of) key components. In examples, the key components may be generated using polynomial interpolation or Shamir secret sharing. In the multi-party key splitting methodology, each different key component may be encrypted using an HD public key for a different trusted computing device 106.

As used herein, the term "encrypting" or its variants, refers to converting data into a code to prevent unauthorized access. Encryption can be implemented in various ways, such as with symmetric encryption using a single encryption key to both encrypt and decrypt data or with asymmetric encryption using a public key to encrypt data and a corresponding private key to decrypt data.

As used herein, the term "signing," or its variants, refers to adding or modifying data associated with a desired transaction using a key (or a key component).

As used herein, unless otherwise specified, the term "user" (or "customer") refers to a person (or automated instructions, e.g., a script) that accesses the user computing device 102 to initiate any of the functionality described herein.

As used herein, the term "wallet" refers to a software program, digital file, and/or memory used to store and/or manage digital assets, such as cryptocurrency. Although the present systems and methods are described herein using cryptocurrency, they are also compatible with any type of digital asset including, but not limited to, encryption keys (unrelated to cryptocurrency/tokens), or other data that needs to be backed up. In examples, a wallet may be defined by one or more private keys, one or more public keys derived from one or more private keys, and/or one or more transaction addresses derived from one or more private keys and/or one or more public keys. In examples, a wallet may be defined by one or more private account keys (and optional corresponding public account key(s)), each of which may have one or more child and/or grandchild transaction keys.

As used herein, the term "distributed ledger" refers to an electronic ledger that is distributed across multiple interconnected nodes, where more than one of the nodes stores a copy of the ledger. In examples, a distributed ledger may implement one or more blockchains to validate the data stored within the distributed ledger. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger, and may be public (i.e., viewable by anyone) or private. Exemplary blockchains include, but are not limited to, the bitcoin blockchain, the Ethereum blockchain, BigchainDB, Billon, Chain, Corda, Credits, Elements, Monax, Fabric, HydraChain, Hyperledger, Multichain, Openchain, Quorum, Sawtooth, and Stellar.

In examples, the user computing device 102 may be a mobile device, e.g., using the Android® or iOS® operating systems. A customer may download, to the user computing device 102, an application corresponding to the remotely located computing device(s) 104. The application may present a user interface on the user computing device 102, and the customer may provide input using the user interface. Based at least in part on the user input, the application on the user computing device 102 may send and receive instructions and/or other data to the remotely located computing device(s) 104. In examples, the application on the user computing device 102 may only communicate directly with the remotely located computing device(s) 104. With some manual intervention, data may be transferred between the remotely located computing device(s) 104 and the trusted computing device(s) 106, e.g., by an individual using a portable storage device, described below.

The remotely located computing device(s) 104 may be operated by a bank or non-bank financial institution that converts currency into other forms of currency, e.g., a money services business (MSB) or another institution or company. In examples, the remotely located computing device(s) 104 may be implemented with one or more servers. The remotely located computing device(s) 104 may maintain a repository for storing keys and/or encrypted shares (e.g., a database and/or secure memory) associated with one or more customer wallets. The repository may be physically located in the same or different device(s) that perform the other functionality of the remotely located computing device(s) 104. The operator of the remotely located computing device(s) 104 may or may not have a money transmitter license required under applicable rules and regulations.

In examples, the remotely located computing device(s) 104 may also assist end-users (i.e., customers) in purchasing cryptocurrency, such as Bitcoin. Specifically, the remotely located computing device(s) 104 may enable customers to convert currency into other forms of currency, e.g., fiat currency into cryptocurrency (e.g., Bitcoin), cryptocurrency (e.g., Bitcoin) into fiat currency, one type of cryptocurrency (e.g., Bitcoin) into a different form of currency (e.g., Ethereum), etc. In examples, the remotely located computing device(s) 104 may also enable customers to transact using cryptocurrency, i.e., buy and/or sell goods and/or services in exchange for cryptocurrency. In addition to cryptocurrency, the remotely located computing device(s) 104 may enable the purchase of and/or transactions using other types of assets, e.g., at least one security, at least one bond, at least one commodity, at least one piece of real property, at least one item of personal property, at least one fund, at least one currency fund, at least one exchange traded fund, at least one mutual fund, at least one index fund, at least one bond fund, at least one commodity fund, or at least one real estate fund.

In order to enable the purchase of cryptocurrency and transactions using cryptocurrency, the remotely located computing device(s) 104 may communicate with an asset exchange in some examples. An asset exchange may be a marketplace (and/or a business entity that operates the marketplace) in which securities, commodities, derivatives and/or other financial instruments are traded, e.g., Kraken, SFOX, Coinbase®, etc. In examples, the asset exchange may serve as a marketplace for cryptocurrency, digital currency, fiat currency, and/or commodity currency. In examples, the asset exchange described herein may record successfully executed transactions on a distributed ledger, e.g., a blockchain. Alternatively, or in addition to, the asset exchange may be configured to trade at least one security, at least one bond, at least one commodity, at least one piece of real property, at least one item of personal property, at least one fund, at least one currency fund, at least one exchange traded fund, at least one mutual fund, at least one index fund, at least one bond fund, at least one commodity fund, or at least one real estate fund. The asset exchange may be implemented using one or more computing devices.

A trusted computing device 106 may be a financial institution or other institution or company. In examples, the trusted computing device 106 may be implemented using one or more computing devices, e.g., that are trusted to hold private keys. In examples, the trusted computing device 106 may be owned and operated by a credit union or a bank. The trusted computing device 106 may maintain a key repository for storing keys (e.g., a database and/or secure memory) associated with one or more customer wallets. The key repository may be physically located in the same or different device(s) that perform the other functionality of the trusted computing device 106. In examples, the key(s) (or key components) stored at the key repository for the trusted computing device 106 may be used in emergencies, e.g., when the user computing device 102 (and any keys stored thereon) is lost, broken, upgraded or hard reset/reformatted. Optionally, the trusted computing device 106 may have a money transmitter license required under applicable rules and regulations.

Each of the devices in the system 100A may be communicatively coupled to one or more other devices using at least one network 108. In examples, the at least one network 108 includes at least one wired network and/or at least one wireless network. In examples, any combination of wired and wireless networks may be used to couple the user computing device 102, the remotely located computing device(s) 104, and the trusted computing device 106 to each other. In examples, the at least one network 108 includes at least one of at least one local area network (LAN), at least one wide area network (WAN), or the Internet. In examples, any combination of local area networks, wide area networks, or the Internet may be used as the at least one network 108 to couple the user computing device 102, the remotely located computing device(s) 104 to each other. In other embodiments, the trusted computing devices 106 can also be connected to the remotely located computing device(s) 104 and/or the user computing device 102 through the at least one network 108.

In examples, the user computing device 102 includes a network interface (such as network interface 706) for communicating with remotely located computing device(s) 104 across the network 108. In examples where the trusted computing devices 106 are air-gapped, the remotely located computing device(s) 104 includes a removeable storage interface for providing data onto a mobile storage device that can be transported to and interfaced with the trusted computing device(s) 106 where the trusted computing device(s) 106 also have a mobile storage interface. Data can also be provided using the mobile storage device in reverse from the trusted computing device(s) 106 to the remotely located computing device(s) 104. In other examples, data can be transported between the remotely located computing device(s) 104 and the trusted computing device(s) 106 in different ways, such as through QR codes, via a network, manual entry, etc.

In examples, the user computing device 102 breaks a secret 110 up into a plurality of shares 112. In examples, the plurality of shares is two. In examples, the user computing device 102 breaks the secret into the plurality of shares 112 using polynomial interpolation or Shamir secret sharing. In examples, the shares are Shamir secret shares. In examples, the user computing device 102 is configured to encrypt each of the shares 112 based on a different public encryption key 118. In examples, each public encryption key 118 is derived from an HD public encryption key 116, which corresponds to a different HD private decryption key 114 at a different trusted computing device 106. Each public encryption key 118 is part of an encrypting key pair with a corresponding private decryption key (not shown in FIG. 1A), where only the private decryption key can decrypt data that was encrypted using the corresponding public encryption key 118.

In examples, a first HD public encryption key 116-1 corresponding to the first HD private decryption key 114-1 is stored at the remotely located computing device(s) 104 and can be used to derive a first public encryption key 118-1 for the particular user of the user computing device 102. This first public encryption key 118-1 is provided to the user computing device 102 to be used in the encryption of a first share 112-1.

In examples, a second HD public encryption key 116-2 corresponding to the second HD private decryption key 114-2 is stored at the remotely located computing device(s) 104 and can be used to derive a second public encryption key 118-2 for the particular user of the user computing device 102. This second public encryption key 118-2 is provided to the user computing device 102 to be used in the encryption of a second share 112-2. In examples, any quantity of additional public encryption keys 118 can be provided to the user computing device 102 to be used in encryption of additional shares 112 using a similar methodology.

In examples, a share hash 122 of each share 112 is also created and saved following the splitting of the secret 110. In examples, the user computing device 102 may use a cryptographic hashing function that takes an input (e.g., a share 112) and returns a share hash 122 (a string of characters). The input (e.g., a share 112) to a hashing function is uniquely deterministic of the output (the share hash 122). In other words, the hashing function will only produce a share hash 122 of a particular value from one particular input (e.g., share 112), and any change to the input (e.g., share 112) will produce a different share hash 122. Examples of hashing functions that could be used include, without limitation: SHA-1, SHA-256, SHA-512, MD4, MD5, RIPEMD160, etc.

Optionally, a private signature key 128 is also used in the encryption of the shares 112. In examples, the private signature key 128 is generated by, and stored on, the user computing device 102. In examples, the private signature key 128 corresponds to a public signature key (not shown in FIG. 1A). In examples, the user computing device 102 encrypts the shares 112 using an Elliptic Curve Diffie Hellman (ECDH) operation. In examples using ECDH, each public encryption key 118 is provided with the private signature key 128 to the ECDH operation, which outputs a respective ECDH key 135. Respective AES keys 136 are then generated, each as a hash of (1) a respective ECDH key 135; (2) the public signature key 130; and (3) a respective public encryption key 118. Each AES key 136 is symmetrically encrypted with the share 112 into the corresponding encrypted share 120. Accordingly, a different ECDH key 135, AES key 136, and encrypted share 120 may be generated for each share 112 of the secret 110.

In examples, the private signature key 128 is common for all shares 112 and each respective public encryption key 118 is unique to a respective share 112. The public encryption key 118 can be the same or different than the private signature key 128. The advantages of using ECDH is that the share 112 doesn't need to be signed separately, while still providing proof that both parties have their private keys. Alternatively, in examples where ECDH is not used, each share 112 may be encrypted with a respective public encryption key 118 (to produce an encrypted share 120), either with or without subsequently signing the encrypted share 120 with the private signature key 128.

In examples, the encrypted shares 120 are provided to the remotely located computing device(s) 104 for storage to be used later during recovery. In examples, the corresponding share hashes 122 are also provided to the remotely located computing device(s) 104. In examples, the user computing device 102 may generate an authentication key pair including an authentication public key and an authentication private key (not shown). In examples, the user computing device 102 may sign the encrypted shares 120 and/or share hashes 122 that are sent to the remotely located computing device 104 using the authentication private key. The authentication public key may also be sent to the remotely located computing device 104 to verify the source of the encrypted shares 120 and/or share hashes 122.

In examples, the remotely located computing device(s) 104 includes (or is communicatively coupled to) a cloud-based file storage repository to store the encrypted shares 120 and/or corresponding share hashes 122, e.g., Google Firestore/Firebase. In examples, the remotely located computing device(s) 104 may store and/or retrieve data from the cloud-based file storage repository. In examples, the computing device(s) 104 and/or share hashes 122 are redundantly stored at the remotely located computing device(s) 104 and/or backup copies are stored on other devices.

FIG. 1B is a block diagram illustrating an example system 100B for secret 110 recovery using encrypted secret shares 120. In examples, the system 100B includes the same and/or similar components to the system 100A connected in the same and/or similar ways. In examples, system 100B includes the user computing device(s) 102 (which needs the key/secret recovered), remotely located computing device(s) 104, and trusted computing devices 106.

In examples when the secret 110 needs to be recovered at a user computing device 102, the user computing device 102 creates a recovery encryption key pair including a recovery private decryption key 124 and recovery public encryption key 126 to be used in encrypting the recovered data. The recovery public encryption key 126 is provided to the remotely located computing device(s) 104 (and optionally stored there). Some type of verification occurs to verify that the user of the user computing device 102 has permissions to recover the secret 110. This may occur with data transfer from user computing device 102 across network 108 to the remotely located computing device(s) 104 and/or through other communication (e.g., SMS, phone call, etc.) between the user and a customer service representative for the operator of the system 100B. Once the user is verified and the recovery public encryption key 126 is received at the remotely located computing device(s) 104, a previously-stored encrypted share 120, the recovery public encryption key 126, and a customer identifier (such as a customer number) are provided to each of the trusted computing devices 106 that contain a private decryption key 114 corresponding to the previously-stored encrypted share 120. In examples, a first encrypted share 120-1, the recovery public encryption key 126, optional public signature key 130, and a customer identifier are provided to the first trusted computing device 106-1. In examples, a second encrypted share 120-2, the recovery public encryption key 126, optional public signature key 130, and a customer identifier are provided to the second trusted computing device 106-2. In examples, this data is provided from the remotely located computing device(s) 104 to the trusted computing devices 106 using one or more mobile storage devices, such as a USB drive.

If ECDH is used, each trusted computing devices 106 may also generate a recovery signature key pair including a recovery private signature key 132 and a recovery public signature key 134 to be used in encrypting the recovered data. If ECDH is used, the recovery private signature key 132 may be stored on the respective trusted computing device 106, while the recovery public signature key 134 may be transferred to a remotely located computing device 104, then communicated to the user computing device 102.

In examples, each trusted computing device 106 is configured to decrypt the corresponding encrypted share 120 based on a different private decryption key 140 derived from the corresponding HD private decryption key 114 and the customer identifier as the index for the HD private decryption key 114. In examples, each private decryption key 140 corresponds to a public encryption key 118. To decrypt an encrypted share 120 using ECDH, a trusted computing device 106 provides a respective private decryption key 140 and the public signature key 130 (for a particular user computing device 102) to an ECDH operation which outputs a respective ECDH key 135. In examples, even though (1) the ECDH keys 135 are generated at the user computing devices 102 using the public encryption key 118 and the private signature key 128; and (2) the ECDH keys 135 are generated at the trusted computing devices 106 using private decryption keys 140 and the public signature key 130; corresponding ECDH keys 135 at the user computing device(s) 102 and the trusted computing devices 106 are identical. Respective AES keys 136 are then generated, each as a hash of (1) a respective ECDH key 135; (2) the public signature key 130; and (3) a respective public encryption key 118. In examples, corresponding AES keys 136 generated on the user computing device(s) 102 and the trusted computing devices 106 are identical (even though they are generated with similar, but not identical, processes). Each encrypted share 120 combined with a corresponding AES key 136 is symmetrically decrypted at a respective trusted computing device 106 into a corresponding share 112.

For example, the first trusted computing device 106-1 can input a first private decryption key 140 (derived from the first HD private decryption key 114-1 at the customer's index) and the public signature key 130 (e.g., received from the user computing device 102 via a remotely located computing device 104) into the ECDH operation to produce a first ECDH key 135-1, which is identical to the first ECDH key 135-1 generated by the user computing device 102 in some configurations. The first trusted computing device 106-1 can generate a first AES key 136-1 as a hash of (1) the first ECDH key 135-1; (2) the public signature key 130; and (3) the first public encryption key 118-1. The first encrypted share 120-1, combined with the first AES key 136-1 is symmetrically decrypted at the first trusted computing device 106-1 into the first share 112-1 (not shown on the first trusted computing device 106-1).

Similarly, the second trusted computing device 106-2 can use a second private decryption key 140 (derived from the second HD private decryption key 114-2 at the customer's index) and the public signature key 130 (e.g., received from the user computing device 102 via a remotely located computing device 104) produce a second ECDH key 135-2, which is identical to the second ECDH key 135-2 generated by the user computing device 102 in some configurations. The second trusted computing device 106-2 can generate a second AES key 136-2 as a hash of (1) the second ECDH key 135-2; (2) the public signature key 130; and (3) the second public encryption key 118-2. The second encrypted share 120-2, combined with the second AES key 136-2 is symmetrically decrypted at the second trusted computing device 106-2 into the second share 112-2 (not shown on the second trusted computing device 106-2).

Alternatively, in examples not using ECDH, each trusted computing device 106 may decrypt a respective encrypted share 120 using a different private decryption key 140, resulting in a set of un-encrypted shares 112, e.g., without an ECDH operation.

In examples, the now-un-encrypted shares 112 can be hashed and these recovery hashes (not shown) compared to the original share hashes 122 made previously and provided to the trusted computing device 106 to ensure the data is identical.

Each now-un-encrypted share 112 is then re-encrypted at a respective trusted computing device 106, based on a respective recovery public encryption key 126, into a recovery encrypted share 142. In examples, the same recovery public encryption key 126 can be provided to and used by each trusted computing device 106, but in other examples a different recovery public encryption key 126 (with a different recovery private decryption key 124 stored at the user computing device 102) can be used.

In examples using ECDH, a recovery public encryption key 126 and the recovery private signature key 132 are provided to an ECDH operation, which outputs a recovery ECDH key 137. Respective recovery AES keys 138 are then generated, each as a hash of (1) a respective recovery ECDH key 137; (2) a respective recovery public signature key 134; and (3) the recovery public encryption key 126. Each recovery AES key 138 is symmetrically encrypted with a share 112 into the corresponding recovery encrypted share 142. Accordingly, a different recovery ECDH key 137, recovery AES key 138, and recovery encrypted share 142 may be generated at each trusted computing device 106.

Alternatively, in examples where ECDH is not used, each share 112 may be encrypted with the recovery public encryption key 126 (to produce a recovery encrypted share 142), either with or without subsequently signing the recovery encrypted share with the recovery private signature key 132.

In examples, the re-encrypted recovery encrypted shares 142 are transferred back to the remotely located computing device(s) 104 (such as on a mobile storage) and back to the user computing device 102 (such as through the network 108). In examples, data for multiple users (seeking recovery of their respective secret 110) is transferred from a trusted computing device 106 to a remotely located computing device 104 in a single batch (via a mobile storage device). The user computing device 102 can then decrypt the recovery encrypted shares 142 based on the recovery private decryption key(s) 124 and restore the secret 110.

To decrypt a recovery encrypted share 142 using ECDH, the user computing device 102 provides a recovery private decryption key 124 and a respective recovery public signature key 134 (for a particular trusted computing device 106) to an ECDH operation, which outputs a respective recovery ECDH key 137. In some configurations, the recovery ECDH keys 137 generated at the user computing device 102 are identical to corresponding recovery ECDH keys 137 generated at the trusted computing devices 106, even though they are generated with similar, but not identical, processes. For example, the user computing device 102 can input the recovery private decryption key 124 and the first recovery public signature key 134-1 into the ECDH operation to produce a first recovery ECDH key 137-1, which is identical to the first recovery ECDH key 137-1 used to re-encrypt a first recovery encrypted share 142-1. Similarly, the user computing device 102 can input the recovery private decryption key 124 and the second recovery public signature key 134-2 into the ECDH operation to produce a second recovery ECDH key 137-2, which is identical to the second recovery ECDH key 137-2 used to re-encrypt a second recovery encrypted share 142-2. Respective recovery AES keys 138 are then generated, each as a hash of (1) a respective recovery ECDH key 137; (2) a respective recovery public signature key 134; and (3) the recovery public encryption key 126. In examples, corresponding recovery AES keys 138 generated on the user computing device(s) 102 and the trusted computing devices 106 are identical, even though they are generated with similar, but not identical, processes. Each recovery encrypted share 142 combined with a corresponding recovery AES key 138 is symmetrically decrypted at the user computing device into a corresponding share 112.

Alternatively, in examples not using ECDH, the user computing device 102 may decrypt a respective recovery encrypted share 142 using a different recovery private decryption key 124, resulting in a set of un-encrypted shares 112, e.g., without an ECDH operation. Whether or not ECDH is used, the un-encrypted shares 112 may then be combined to reconstitute the secret 110.

It should be noted that the first AES key 136-1 and the second AES key 136-2 at the user computing device 102 are identical to the first AES key 136-1 (at the first trusted computing device 106-1) and the second AES key 136-2 (at the first trusted computing device 106-2), respectively. Furthermore, the first recovery AES key 138-1 and the second recovery AES key 138-2 at the user computing device 102 are identical to the first recovery AES key 138-1 (at the first trusted computing device 106-1) and the second recovery AES key 138-2 (at the first trusted computing device 106-2), respectively. However, in examples, the first AES key 136-1 is not identical to the first recovery AES key 138-1, nor is the second AES key 136-2 identical to the second recovery AES key 138-2.

Figure 2A:
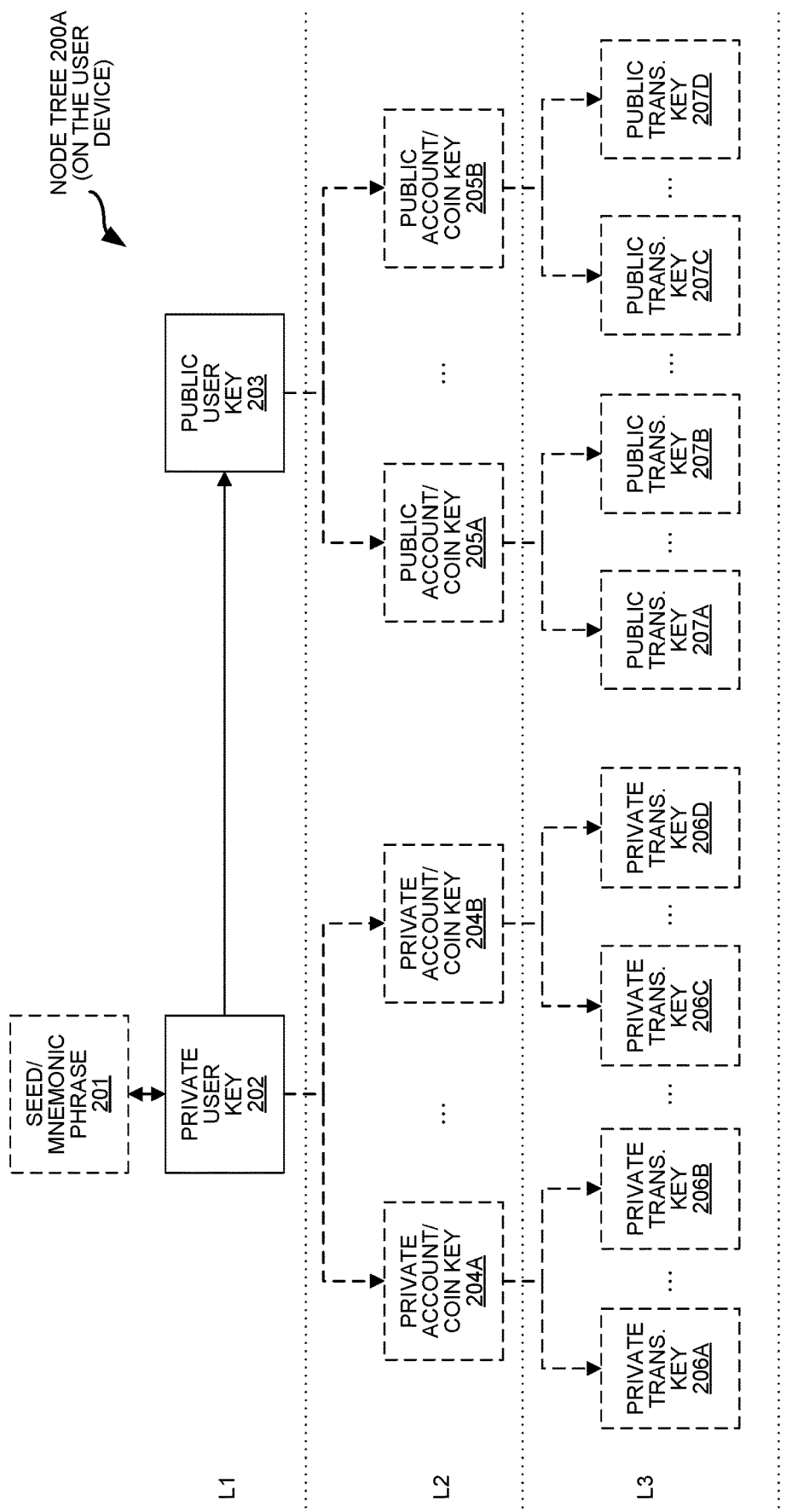
FIG. 2A is a block diagram illustrating an example node tree on the customer device for implementing a customer wallet.

FIG. 2A is a block diagram illustrating an example node tree on the customer device for implementing a customer wallet. In examples, the node tree 200A may implement a hierarchical deterministic (HD) wallets for a customer according to portions of Bitcoin Improvement Proposal 32 (BIP32) and/or portions of Bitcoin Improvement Proposal 44 (BIP44). BIP32 (available at https://github.com/bitcoin/bips/blob/master/bip-0032.mediawiki) and BIP44 (available at https://github.com/bitcoin/bips/blob/master/bip-0044.mediawiki) are incorporated by reference herein.

The node tree 200A may reside on the user computing device 102 and may include a hierarchy of levels. Specifically, the node tree 200A may include a private user key 202 and a private account key 203 in the first level (L1). The private user key 202 may be a unique string of numbers, letters, and/or other characters that is specific to a customer. The private user key 202 may further be specific to a type of cryptocurrency, e.g., the user computing device 102 may include a different private user key 202 for each type of cryptocurrency stored in a customer wallet. In examples, the user computing device 102 may store a separate private user key 202 for each of Bitcoin, Ethereum, Litecoin, etc. A customer wallet may be defined by the private user key 202 and/or other private account key(s) (not shown).

Optionally, the private user key 202 may be generated at the user computing device 102 based on a seed/pneumonic phrase 201, e.g., a seed that is derived from a mnemonic code or sentence according to Bitcoin Improvement Proposal 39 (BIP39) (available at https://github.com/bitcoin/bips/blob/master/bip-0039.mediawiki and incorporated by reference herein). Alternatively, the private user key 202 may be generated at the user computing device 102 randomly, manually, or by other means.

The private user key 202 may be used to derive a private account key 203, i.e., the private user key 202 may be determinative of the private account key 203. In examples, the user computing device 102 may use a hash function to derive the private account key 203 from the private user key 202, e.g., the SHA256 function. However, the private account key 203 is typically (and preferably) not determinative of the private user key 202, e.g., the private account key 203 may not be used to generate the private user key 202.

The private user key 202 and the private account key 203 may be "extended" keys, meaning that a chain code is appended to the key string. In examples, each of the private user key 202 and the private account key 203 may be 256 bits long with an additional 256-bit chain code, i.e., the extended private user key 202 and the extended private account key 203 may each be 512 bits long. An extended key may be used to derive child keys, while a non-extended (or "hardened") key may not be used to derive child keys. Since they are extended keys, it may be preferable to avoid transmitting the private user key 202 and the private account key 203 from the user computing device 102 to the remotely located computing device(s) 104 or the trusted computing device 106.

The private user key 202 may have one or more optional child private account/coin keys 204A-B in the second level (L2) of the node tree 200A. The private account/coin key(s) 204 may be derived from the private user key 202 using a child key derivation (CKD) function, e.g., as described in BIP32. Each optional child private account/coin keys 204A-B may have one or more optional child private transaction keys 206A-B in the third level (L3) of the node tree 200A. The private transaction key(s) 206 may be derived from the private user key 202 using a child key derivation (CKD) function, e.g., as described in BIP32. The private transaction key(s) 206 may be non-extended (i.e., hardened) keys and may not be used to derive further child keys.

Each private account/coin key 204 and each private transaction key 206 may have an associated index, e.g., in the range of 0 to ($2^{32}$–1). The index may be used to navigate the node tree 200A, i.e., an index may uniquely identify the location of its corresponding particular private account/coin key 204 and/or private transaction key 206. Accordingly, indices may be transmitted between devices as an efficient way to identify a private account/coin key 204 and/or private transaction key 206.

Similarly, the private account key 203 may have one or more optional child public account/coin keys 205A-B in the second level (L2) of the node tree 200A. The public account/coin key(s) 205 may be derived from the public user key 203 using a child key derivation (CKD) function, e.g., as described in BIP32 or derived from an associated private account/coin key 204; i.e., public account/coin key 205A may be derived from private account/coin key 204A and public account/coin key 205B may be derived from private account/coin key 205B. Each optional child private account/coin keys 204A-B may have one or more optional child private transaction keys 206A-B in the third level (L3) of the node tree 200A. The private transaction key(s) 206 may be derived from the private user key 202 using a child key derivation (CKD) function, e.g., as described in BIP32 or derived from an associated private transaction key 206; i.e., public transaction key 207A may be derived from private transaction key 206A and public transaction key 207B may be derived from private transaction key 206B. The public transaction key(s) 207 may be non-extended (i.e., hardened) keys and may not be used to derive further child keys.

Each public account/coin key 205 and each public transaction key 207 may have an associated index, e.g., in the range of 0 to ($2^{32}$–1). The index may be used to navigate the node tree 200A, i.e., an index may uniquely identify the location of its corresponding particular public account/coin key 205 and/or private transaction key 207. Accordingly, indices may be transmitted between devices as an efficient way to identify a public account/coin key 205 and/or public transaction key 207.

In examples, the node tree 200A may include many different nodes and particularly many different (e.g., hundreds, thousands, millions or billions) private transaction keys 206, e.g., a new private transaction key 206 may be generated for every transaction in which cryptocurrency is received into the customer wallet and/or every transaction in which less than all cryptocurrency in an existing transaction address is transferred. Additionally, the node tree 200A may include many (e.g., hundreds, thousands, millions or billions) public transaction keys 207, e.g., one corresponding to each private transaction key 206 in the node tree 200A.

While illustrated with two hierarchical levels (L1-L3), the node tree 200A may include more hierarchical levels. In examples, a change key level (not shown) may be positioned in between L1 and L2.

Figure 2B:
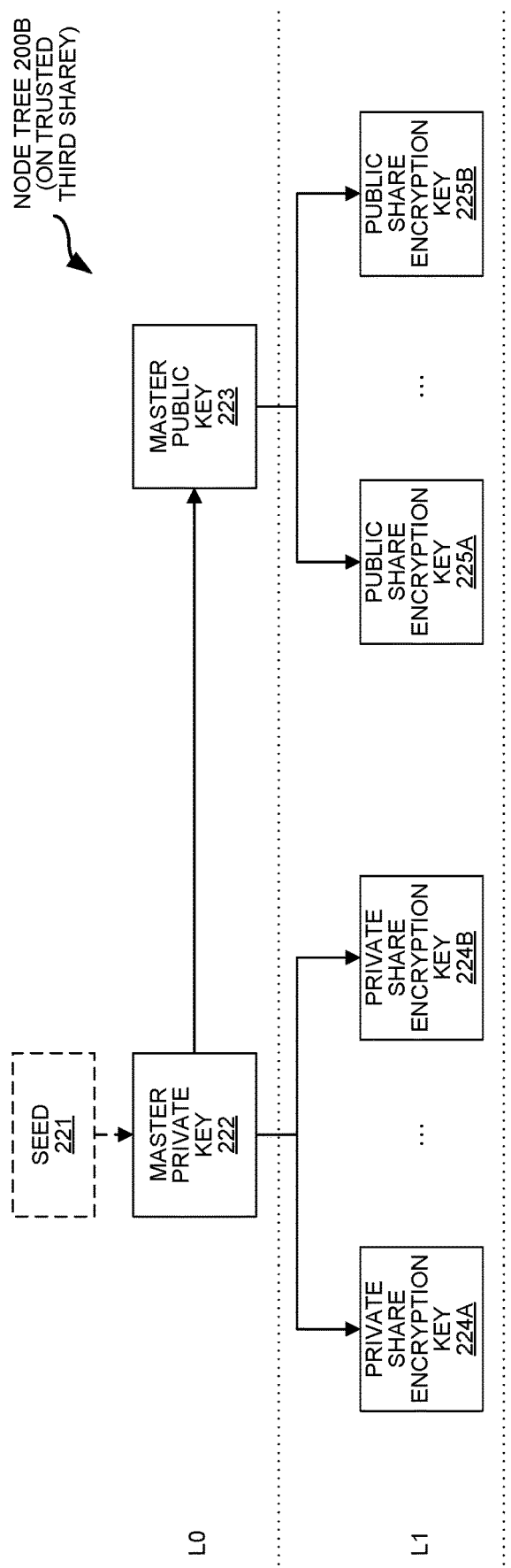
FIG. 2B is a block diagram illustrating another example node tree a third party system for implementing a Hierarchical Deterministic (HD) structure for encryption keys to be used in encryption of secret shares.

FIG. 2B is a block diagram illustrating another example node tree a third party system for implementing a Hierarchical Deterministic (HD) structure for encryption keys to be used in encryption of secret shares. In examples, the node tree 200B may implement one or more HD wallet(s) for one or more customers according to portions of BIP32 and/or portions of BIP44.

The node tree 200B may be stored at the remotely located computing device(s) 104 (e.g., in the repository) and may include a hierarchy of levels. However, unlike the node tree 200A in the user computing device 102, the node tree 200B does not need to go to transaction level and only needs to go to share encryption key level. Specifically, the node tree 200B includes a master private key 222 (that may be generated by a seed 221) and a corresponding master public key 223 in the first level (L0). Specifically, trusted computing devices 106 may each store a single private share encryption key 224 that is used to derive one or more private share encryption keys 224A-B. In other words, the private share encryption key 224 may be the parent private key for all private share encryption keys 224 stored at the remotely located computing device(s) 104. Optionally, the private share encryption key 224 may be generated at the remotely located computing device(s) 104 based on a seed 221, e.g., a seed that is derived from a mnemonic code or sentence according to BIP39. Alternatively, the private share encryption key 224 may be generated at the remotely located computing device(s) 104 randomly, manually, or by other means.

The private share encryption key 224 may be used to derive a master public key 223, which may be a parent public key to all public share encryption keys 225A-B on the remotely located computing device(s) 104. The private share encryption key 224 and the master public key 223 may be extended keys. Therefore, it may be preferable to avoid transmitting the private share encryption key 224 and the master public key 223 from the remotely located computing device(s) 104.

In examples, a first share encryption key 224A and a first share encryption key 225A may be maintained for a first customer, while a second share encryption key 224B and a second share encryption key 225B may be maintained for a second customer. Alternatively, the first share encryption key 224A and the first share encryption key 225A may be maintained for a first type of cryptocurrency held in a customer wallet, while the second share encryption key 224B and the second share encryption key 225B may be maintained for a second type of cryptocurrency held in the same customer wallet. The first type and the second type may be selected from among Bitcoin, Ethereum, Litecoin, etc.

In examples, the node tree 200B may include a share encryption key 224 and a share encryption key 225 per customer per cryptocurrency type, i.e., if 10 customers each held 3 different types of cryptocurrency at the remotely located computing device(s) 104, the node tree 200B may include 30 (i.e., 10×3) private share encryption keys 224 and 30 public share encryption keys 225. Since they are extended keys, it may be preferable to avoid transmitting the private share encryption keys 224 and the public share encryption keys 225 from the remotely located computing device(s) 104 to the user computing device 102 or the trusted computing device 106.

The private share encryption keys 224A-B and public share encryption keys 225A-B in the second level (L1) of the node tree 200B may correspond to (but are not identical to) private account keys and public account keys stored on various customer devices 102 and a trusted computing device 106.

While illustrated with two hierarchical levels (L0-L1), the node tree 200B may include more hierarchical levels.

Figure 3A:
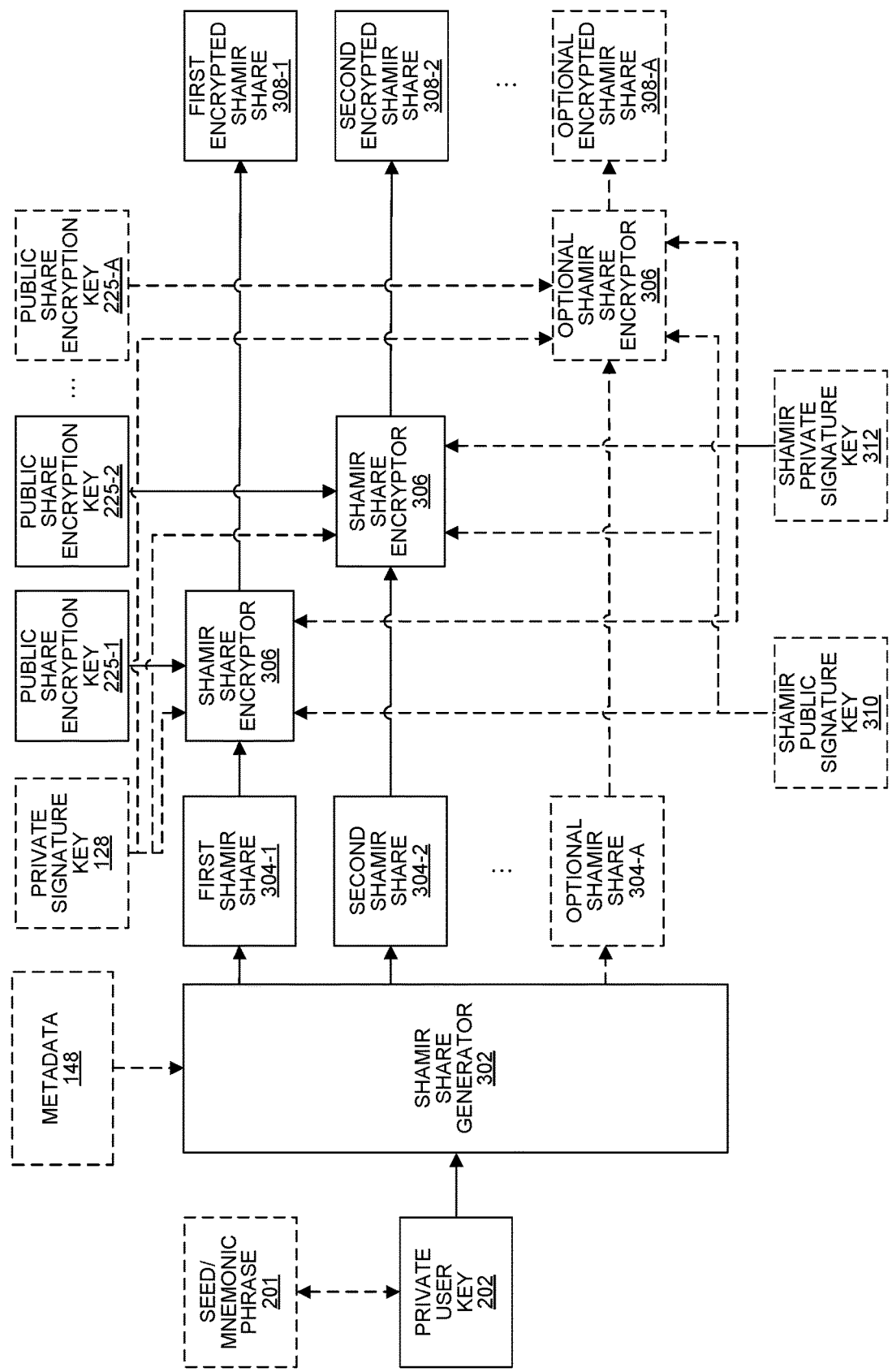
FIG. 3A is a block diagram illustrating an example system for generation and encryption of secret shares of a private user key.
Figure 3B:
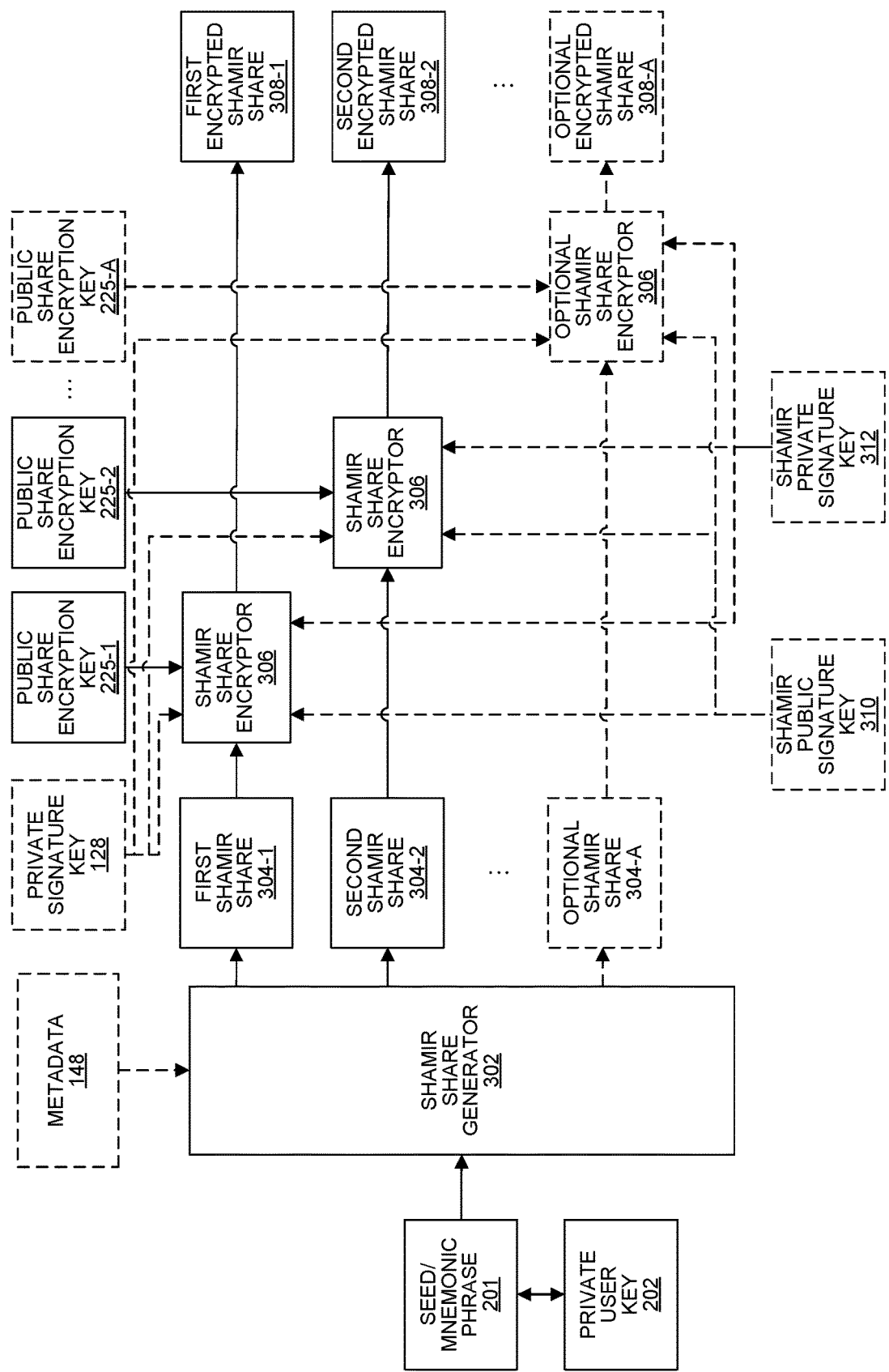
FIG. 3B is a block diagram illustrating another example system for generation and encryption of secret shares of a seed/mnemonic phrase that can be used to restore a private user key.

FIGS. 3A-3B are block diagrams illustrating example systems for generation and encryption of secret shares of a secret. FIG. 3A is a block diagram illustrating an example system for generation and encryption of secret shares of a private user key 202 itself, while FIG. 3B is a block diagram illustrating another example system for generation and encryption of secret shares of a seed/mnemonic phrase 201 that can be used to restore a private user key 202. In examples, a secret (such as a private user key 202 in FIG. 3A or a seed/mnemonic phrase 201 in FIG. 3B) is provided to a Shamir share generator 302 (or other share generator) that generates a plurality of Shamir shares 304 (such as first Shamir share 304-1, second Shamir share 304-2, and any quantity of optional Shamir shares 304 through optional Shamir share 304-A) of the secret, where a plurality of the Shamir shares 304 can be used to regenerate the secret. In examples, M of M Shamir shares 304 are required to regenerate the secret, e.g., 2 of 2, 3 of 3, 4 of 4, 5 of 5, 10 of 10, etc. In other examples, M of N Shamir shares are required to generate the secret, e.g., 2 of 3, 3 of 4, 3 of 5, etc. Optionally, metadata 148 is used during share 112 generation to indicate how many shares 112 are required to reconstruct the secret.

In ECDH-based encryption examples at a user computing device 102, each public share encryption key 225 (e.g., a public encryption key 118) is provided with a Shamir private signature key 312 (e.g., a private signature key 128 of the user computing device 102) to the ECDH operation, which outputs a respective ECDH key 135 (not shown in FIGS. 3A-3B). Respective AES keys 136 (not shown in FIGS. 3A-3B) are then generated, each as a hash of (1) a respective ECDH key 135; (2) a Shamir public signature key 310 (e.g., a public signature key 130 of the user computing device 102); and (3) a respective public share encryption key 225 (e.g., a public encryption key 118). Each AES key 136 is symmetrically encrypted with a Shamir share 304 (e.g., share 112) into a respective encrypted Shamir share 308 (e.g., an encrypted share 120).

In ECDH-based encryption examples at a trusted computing device 106, each public share encryption key 225 (e.g., a recovery public encryption key 126) is provided with the Shamir private signature key 312 (e.g., a recovery private signature key 132 of the trusted computing device 106) to the ECDH operation, which outputs a respective recovery ECDH key 137 (not shown in FIGS. 3A-3B). Respective recovery AES keys 138 (not shown in FIGS. 3A-3B) are then generated, each as a hash of (1) a respective recovery ECDH key 137; (2) a Shamir public signature key 310 (e.g., a recovery public signature key 126 of the trusted computing device 106); and (3) a respective public share encryption key 225 (e.g., a recovery public encryption key 126). Each recovery AES key 138 is symmetrically encrypted with a Shamir share 304 (e.g., share 112) into a respective encrypted Shamir share 308 (e.g., a recovery encrypted share 142).

In examples not using ECDH, each Shamir share 304 is encrypted (in the Shamir share encryptor 306) using a different public share encryption key 225, resulting in a set of encrypted Shamir shares 308 (including first encrypted Shamir share 308-1, second encrypted Shamir share 308-2, and any quantity of optional encrypted Shamir shares 308 through optional encrypted Shamir share 308-A). Even though the Shamir share encryptor 306 does not implement ECDH in non-ECDH examples, the encrypted Shamir shares 308 may optionally be subsequently signed using the Shamir private signature key 312.

Figure 4:
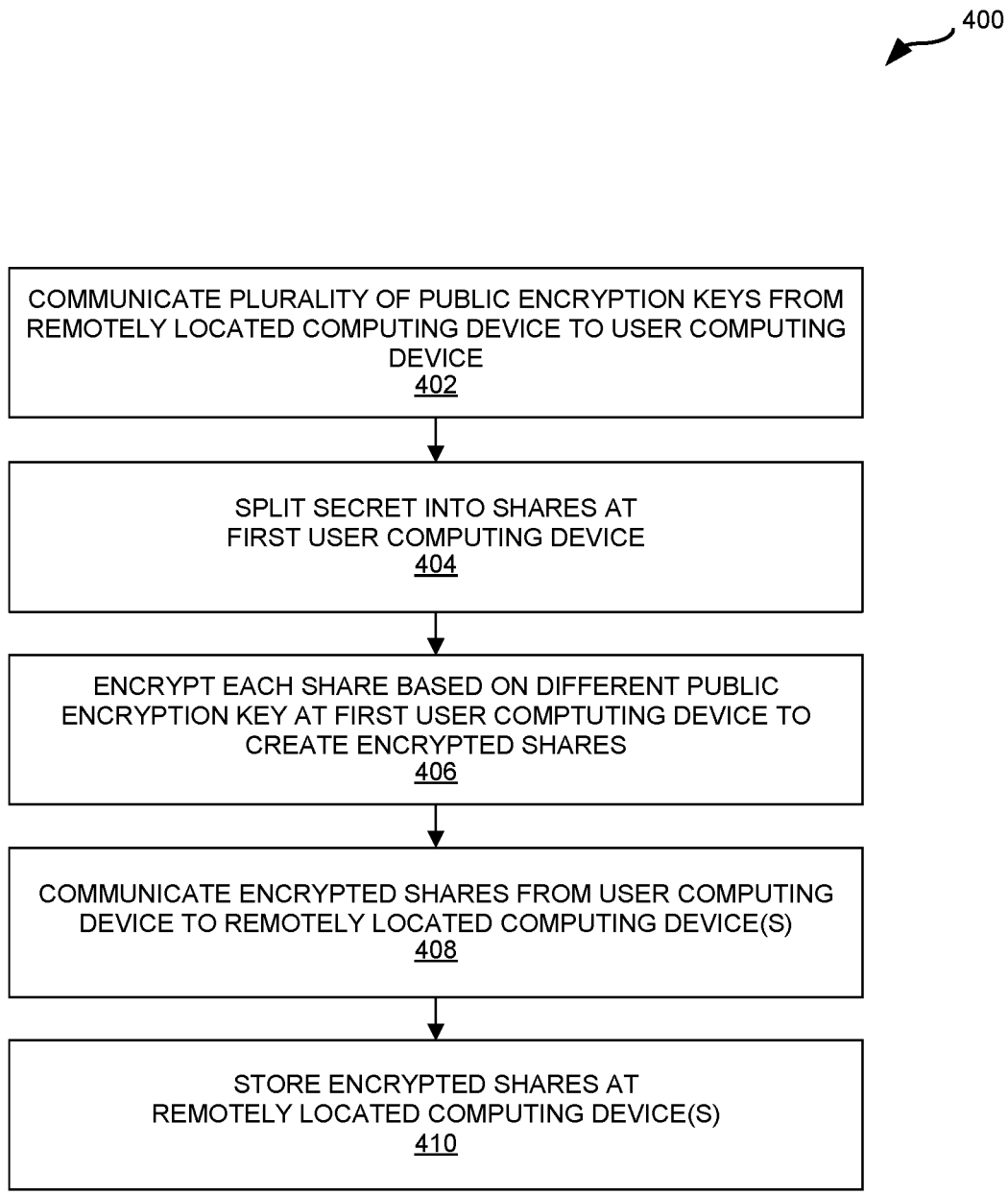
FIG. 4 is a flow diagram illustrating an example method for generating and encrypting secret shares of a secret.

FIG. 4 is a flow diagram illustrating an example method 400 for generating and encrypting secret shares 112 of a secret 110. The method 400 may be performed by the user computing device(s) 102, the remotely located computing device(s) 104, and/or the trusted computing devices 106. Each of the user computing device(s) 102, the remotely located computing device(s) 104, and/or the trusted computing devices 106 may implement at least one processor that executes instructions stored in at least one memory.

The method 400 begins at block 402 with communicating a plurality of public encryption keys 118 from at least one remotely located computing device 104 to a user computing device 102. This communication may include the remotely located computing device 104 transmitting the plurality of public encryption keys 118 across at least one network 108. In examples, each public encryption key 118 is derived from a respective HD public encryption key 116 at the remotely located computing device(s) 104 (where each HD public encryption key 116 corresponds to a respective HD private decryption key 114 stored on a respective trusted computing device 106). There is little concern with transmitting the plurality of public encryption keys 118 across at least one network 108 because they are "public" (not "private") keys.

The method 400 proceeds to block 404 with splitting a secret 110 into shares 112 at the first user computing device 102. In examples, the secret 110 is split into shares 112 using polynomial interpolation and/or Shamir secret sharing. In examples, the secret 110 is split into M shares 112. In such a configuration, all M of M shares 112 are required to reconstruct the secret 110. In examples, each share 112 is stored at one of M different trusted computing devices 106. Alternatively, more than one of the shares 112 can be stored at an individual trusted computing device 106, e.g., so less than M trusted computing devices 106 are used.

Alternatively, the secret 110 is split into N shares 112, each being stored at a different trusted computing device 106. In such a configuration, only M of N trusted computing devices 106 would need to be involved in recovering the secret 110 (where M<N). Optionally, M and/or N (depending on the configuration used) may be selected by the user during account setup/onboarding, e.g., and may be specified in the metadata 148.

Optionally, the user computing device 102 may also determine a share hash 122 of each share 112 following the splitting of the secret 110 (and before encryption). In examples, the user computing device 102 may use a hashing function that takes an input (e.g., a share 112) and returns a string of characters (a share hash 122). The input (e.g., the share 112) of a hashing function is uniquely deterministic of the output (e.g., the share hash 122). In other words, the hashing function will only produce a hash (e.g., share hash 122) of a particular value from one particular input (e.g., share 112), and any change to the input (e.g., share 112) will produce a different hash (e.g., share hash 122).

The method 400 proceeds to block 406 with encrypting each share 112 based on a different public encryption key 118 at the first user computing device 102 to create encrypted shares 120. In examples, each share 112 is encrypted using an Elliptic Curve Diffie Hellman (ECDH) operation. In examples using ECDH, each public encryption key 118 is provided with the private signature key 128 to the ECDH operation, which outputs a respective ECDH key 135. Respective AES keys 136 are then generated, each as a hash of (1) a respective ECDH key 135; (2) the public signature key 130; and (3) a respective public encryption key 118. Each AES key 136 is symmetrically encrypted with the share 112 into the corresponding encrypted share 120.

In examples not using ECDH, each share 112 is asymmetrically encrypted using a different public encryption key 118, resulting in a set of encrypted shares 120. In non-ECDH examples, the encrypted shares 120 may optionally be subsequently signed using the private signature key 128.

The method 400 proceeds to block 408 with communicating the encrypted shares 120 from the user computing device 102 to remotely located computing device(s) 104. This communication may include the user computing device 102 transmitting the encrypted shares 120 to remotely located computing device(s) 104 across at least one network 108. In examples, there is a remotely located computing device 104 located at each location of a trusted computing device 106 used for the user computing device 102. In a first example, a first trusted computing device 106 and a second trusted computing device 106 are located at a first location and a second location, respectively. In the first example, a first remotely located computing device 104 and a second remotely located computing device 104 are also located at the first location and the second location, respectively, e.g., where (1) the first remotely located computing device 104 can be used to transfer data (with some manual intervention) to and from the first trusted computing device 106, if necessary; and (2) the second remotely located computing device 104 can be used to transfer data (with some manual intervention) to and from the second trusted computing device 106, if necessary.

In a second example, a first trusted computing device 106 and a second trusted computing device 106 are located at a first location. In the second example, a first remotely located computing device 104 may be located at the first location. In the second example, the first remotely located computing device 104 can transfer data (with some manual intervention) to and from (1) the first trusted computing device 106, if necessary; and (2) the second trusted computing device 106, if necessary.

Optionally, a share hash 122 of each un-encrypted share 112 may also be communicated from the user computing device 102 to remotely located computing device(s) 104.

Optionally, the user computing device 102 may generate an authentication key pair including an authentication public key 144 and an authentication private key 146, and send the authentication public key to the remotely located computing device(s) 104. In examples, the user computing device 102 may sign the encrypted shares 120 (and optionally share hashes 122) that are sent to the remotely located computing device(s) 104 in block 408. In examples, the remotely located computing device(s) 104 may use the authentication public key 144 to verify the source of the encrypted shares 120 (and optionally share hashes 122).

The method 400 proceeds to block 410 with storing the encrypted shares 120 at remotely located computing device(s) 104. In examples, the remotely located computing device(s) 104 includes (or is communicatively coupled to) a cloud-based file storage repository to store the encrypted shares 120. In examples, the remotely located computing device(s) 104 may store and/or retrieve data from the cloud-based file storage repository. Optionally, the remotely located computing device(s) 104 also stores a share hash 122 of each share 112, e.g., in the cloud-based file storage repository.

Figure 5:
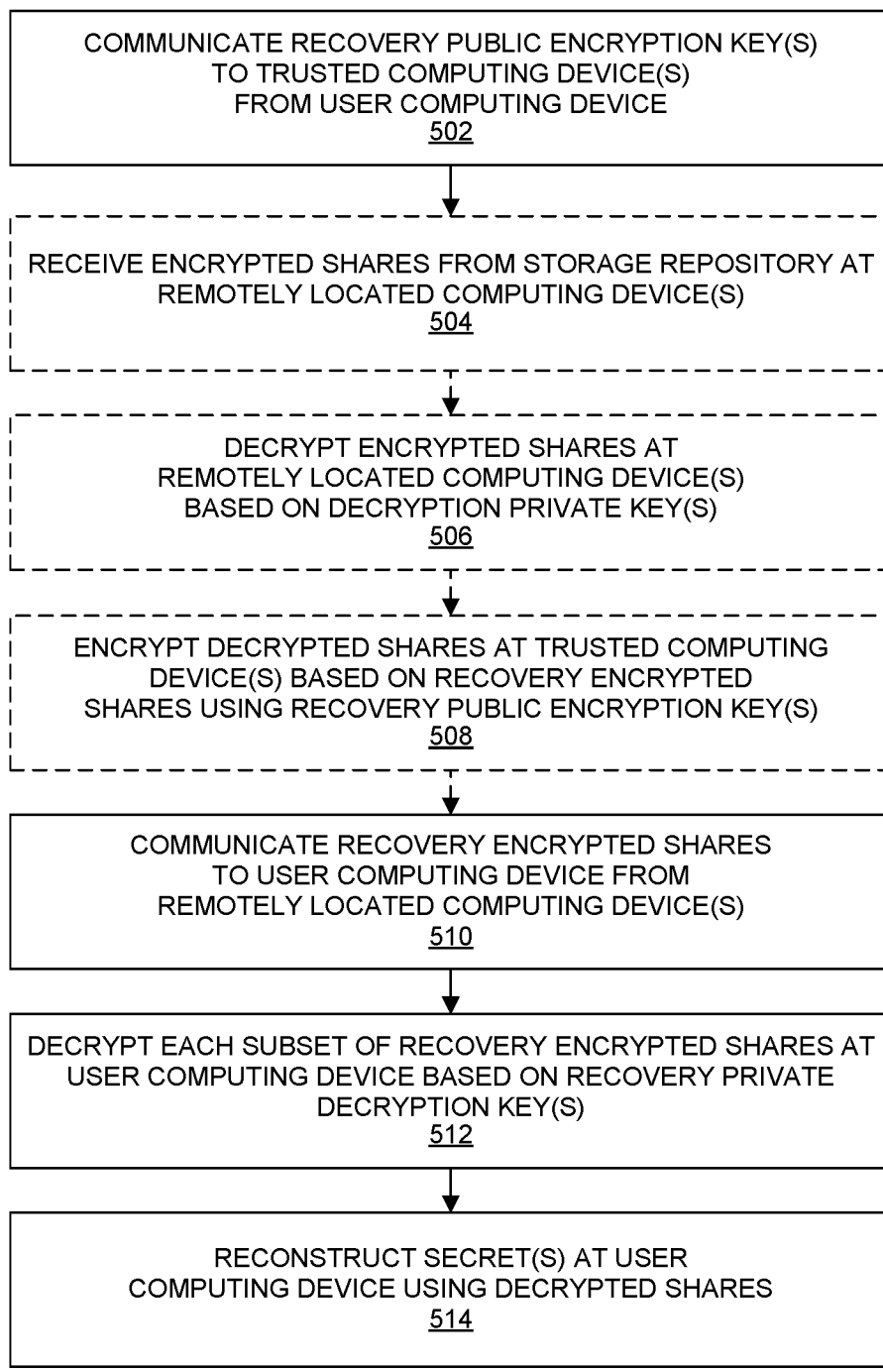
FIG. 5 is a flow diagram illustrating an example method for restoring a secret from encrypted secret shares of the secret.

FIG. 5 is a flow diagram illustrating an example method 500 for restoring a secret 110 from encrypted secret shares 112 of the secret 110. The method 500 can be used to restore a customer wallet if the user computing device 102 is lost, broken, upgraded or hard reset/formatted. In examples, the method 500 of FIG. 5 is performed after the method 400 of FIG. 4. The method 500 may be performed by the user computing device(s) 102, the remotely located computing device(s) 104, and/or the trusted computing devices 106. Each of the user computing device(s) 102, the remotely located computing device(s) 104, and/or the trusted computing devices 106 may implement at least one processor that executes instructions stored in at least one memory.

The method 500 begins at block 502 with communicating recovery public encryption key(s) 126 to trusted computing device(s) 106 from a user computing device 102. This communication may include the user computing device 102 transmitting the recovery public encryption key(s) 126 to remotely located computing device(s) 104 (e.g., across at least one network 108) after which the recovery public encryption key(s) 126 are transferred from the remotely located computing device(s) 104 to the trusted computing devices 106 (e.g., using one or more mobile storage devices, such as a USB drive). In examples, the recovery public encryption key(s) 126 are generated at the user computing device 102, each corresponding to a recovery private decryption key 124. The remotely located computing device(s) 104 may optionally store the recovery public encryption key(s) 126 (e.g., in a cloud-based file storage repository) in addition to transferring them to the trusted computing device(s) 106.

Optionally, the user computing device 102 may also generate a signature key pair with a private signature key 128 and a public signature key 130. The user computing device 102 may optionally communicate the public signature key 130 to the remotely located computing device(s) 104, e.g., across at least one network 108. The remotely located computing device(s) 104 may then optionally transfer the public signature key 130 to the trusted computing devices 106, e.g., using one or more mobile storage devices, such as a USB drive.

Optionally, each of M trusted computing devices 106 may generate a recovery signature key pair including a recovery private signature key 132 and a recovery public signature key 134 to be used in encrypting the recovered data. The trusted computing devices 106 may optionally transfer the recovery public signature keys 134 to a remotely located computing device(s) 104 (e.g., using a mobile storage device, such as a USB drive), which communicates them to the user computing device 102 (e.g., across at least one network 108).

The method 500 proceeds to optional block 504 with receiving the encrypted shares 120 from a storage repository (e.g., the cloud-based file storage repository) at the remotely located computing device(s) 104. In examples, the encrypted shares 120 were encrypted as described in block 406 of the method 400 of FIG. 4. In examples, the encrypted shares 120 are transferred from the remotely located computing device(s) 104 to the trusted computing devices 106 using one or more mobile storage devices, such as a USB drive.

Optionally, the encrypted shares 120 are only received (from the storage repository) after the user of the user computing device 102 has been verified as having permission to recover a secret 110. This may occur with data transfer from user computing device 102 across network 108 to the remotely located computing device(s) 104 and/or through other communication between the user and a customer service representative for the operator of the system 100B (e.g., SMS, telephone conversation, etc.).

The method 500 proceeds to optional block 506 with decrypting the encrypted shares 120 at trusted computing device(s) 106 based on private decryption key(s) 140. In examples, different private decryption keys 140 may be stored on different trusted computing device 106 and correspond to a different public encryption key 118, where only the private decryption key 140 can decrypt data that was encrypted using the corresponding public encryption key 118.

To decrypt an encrypted share 120 using ECDH, a trusted computing device 106 provides a respective private decryption key 140 and the public signature key 130 (for a particular user computing device 102) to an ECDH operation which outputs a respective ECDH key 135. Respective AES keys 136 are then generated, each as a hash of (1) a respective ECDH key 135; (2) the public signature key 130; and (3) a respective public encryption key 118. Each encrypted share 120 combined with a corresponding AES key 136 is symmetrically decrypted at a respective trusted computing device 106 into a corresponding share 112.

Alternatively, in examples not using ECDH, each trusted computing device 106 may decrypt a respective encrypted share 120 using a different private decryption key 140, resulting in a set of un-encrypted shares 112, e.g., without an ECDH operation.

The method 500 proceeds to optional block 508 with encrypting the un-encrypted shares 112 at the trusted computing device(s) 106 into recovery encrypted shares 142 based on the recovery public encryption key(s) 126. In examples using ECDH, the recovery public encryption key 126 and a respective recovery private signature key 132 are provided to an ECDH operation on each trusted computing device 106 to produce a respective recovery AES key 138. Each recovery AES keys 138 is then used to encrypt the share 112 into a corresponding recovery encrypted share 142. Alternatively, in examples where ECDH is not used, each share 112 may be encrypted with the recovery public encryption key 126 (to produce a recovery encrypted share 142), either with or without subsequently signing the recovery encrypted share with the recovery private signature key 132.

The method 500 proceeds to block 510 with communicating the recovery encrypted shares 142 to the user computing device 102 from the trusted computing device(s) 106. This communication may include transferring the recovery encrypted shares 142 from the trusted computing devices 106 to the remotely located computing device(s) 104 (e.g., using one or more mobile storage devices, such as a USB drive). The remotely located computing device(s) 104 may then communicate the recovery encrypted shares 142 to the user computing device 102, e.g., across at least one network 108. The remotely located computing device(s) 104 may optionally store the recovery encrypted shares 142 (e.g., in a cloud-based file storage repository) in addition to transferring them to the user computing device(s) 102.

The method 500 proceeds to block 512 with decrypting each subset of recovery encrypted shares 142 at the user computing device 102 based on the recovery private decryption key(s) 124 corresponding to the recovery public encryption key(s) 126. To decrypt an encrypted share 120 using ECDH, the user computing device 102 provides the recovery private decryption key 124 and a respective recovery public signature key 134 (for a particular trusted computing device 106) to an ECDH operation which outputs a recovery AES key 138, which is identical to the recovery AES key 138 the trusted computing device 106 used to re-encrypt the share 112 into the corresponding recovery encrypted share 142 (in block 508). The user computing device 102 may then use a respective recovery AES key 138 to decrypt each recovery encrypted share 142 to produce a respective share 112.

Alternatively, in examples not using ECDH, the user computing device 102 may decrypt a respective recovery encrypted share 142 using a different recovery private decryption key 124, resulting in a set of un-encrypted shares 112, e.g., without an ECDH operation.

The method 500 proceeds to block 514 with reconstructing secret(s) 110 at a user computing device 102 using un-encrypted shares 112. In examples, a secret 110 may be reconstructed by combining M of M shares 112. Alternatively, only M of N shares 112 may be required to reconstruct the secret 110. The requirements for reconstruction may be based on metadata 148 produced during Shamir splitting of the secret 110.

Figure 6:
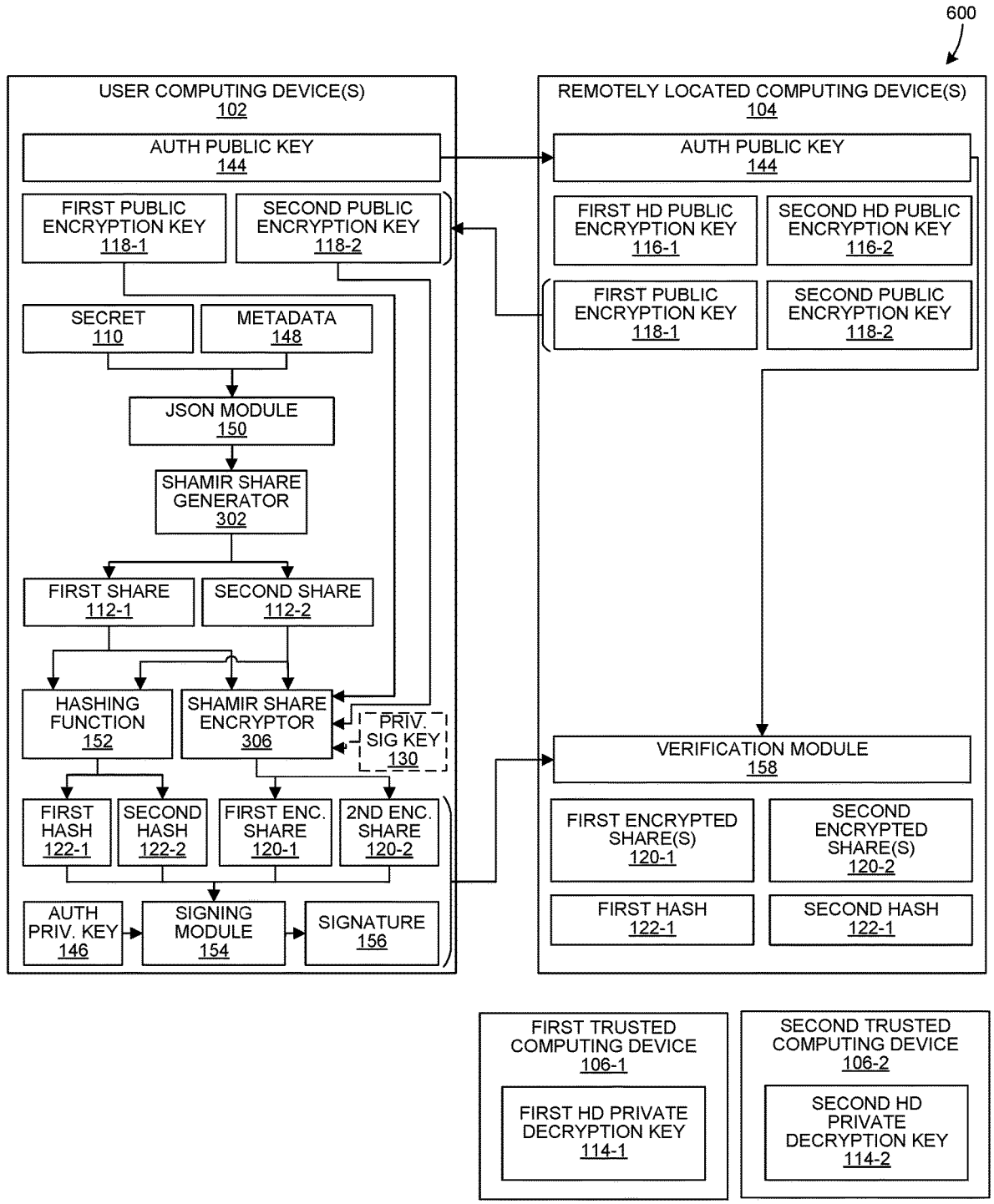
FIG. 6 is a block diagram illustrating a method for generation, encryption, and distribution of secret shares.

FIG. 6 is a block diagram illustrating a method 600 for generation, encryption, and distribution of secret shares 112. The method 600 may be performed in system similar to the systems 100A-B illustrated in FIGS. 1A-B. Specifically, the method 600 is performed in a system that includes a user computing device 102 (e.g., a smart phone), a remotely located computing device 104, a first trusted computing device 106-1, and a second computing device 106-2. It is understood that the method 600 may be performed in systems with more or less of any of the devices illustrated in FIG. 6. In examples, there may be two different remotely located computing devices 104, a first one at the location of the first trusted computing device 106-1, and a second one at the location of the second trusted computing device 106-2. In examples, not all the illustrated steps are performed, and/or the steps are performed in a different order.

Additionally, the remotely located computing device 104 (1) communicates with the user computing device 102 via at least one network 108; and (2) includes and/or is communicatively coupled to a storage repository, e.g., a cloud-based file storage repository, such as Google Firestore/Firebase. Additionally, the trusted computing devices 106 may be air-gapped devices (e.g., laptops) that can only receive and send data via manually transfer data using a mobile storage device, such as a USB drive.

The method 600 begins when a user of the user computing device 102 initiates user registration to open a main account, e.g., when the new user has a secret 110 they want to encrypt and distribute. In examples, the user computing device 102 may generate a key pair, e.g., including a public signature key 130 and a private signature key 128. In examples, the user computing device 102 may sign data (e.g., encrypted shares 120 and share hashes 122) that is sent to the remotely located computing device 104 using the private signature key 128, while the public signature key 130 is sent to the remotely located computing device 104 to verify the source of this data.

During registration of the main account, a new account may be populated with the user's identity data and/or payment data, e.g., input by the user and transmitted to the remotely located computing device 104 via a secure protocol. Identity data may include a user's name, date of birth, driver's license number and expiration date, address, phone number(s), email address(es), social security number, image of user's government issued photo identification, photo of the user holding the government issued photo identification, employment information, and/or income. The identity data may also include biometric data, such as fingerprint data (e.g., scan(s) of the user's fingerprint(s)), retinal scan data (e.g., image(s) of the user's retina(s)), facial recognition data (e.g., image(s) of the user's face), and/or voice data (e.g., recording(s) of the user's voice). Instead of raw biometric data (e.g., images and/or recordings), the application may transmit only processed data derived from the raw biometric data, e.g., image features, voice features, etc. Payment data may include bank account information, credit card information, contactless payment data (e.g., Apple Pay® or Android Pay® username and passwords), existing cryptocurrency wallet key, and/or other payment processing information (e.g., username, password, PIN code, and/or other information for PayPal®, WhatsApp®, etc.).

The method 600 proceeds when the remotely located computing device(s) 104 derives a first public encryption key 118-1 and a second public encryption key 118-2 from a first HD public encryption key 116-1 and a second HD public encryption key 116-2, respectively. In examples, the first HD public encryption key 116-1 and the second HD public encryption key 116-2 are in the same tree as the first HD private encryption key 114-1 stored at the first trusted computing device 106-1 and a second HD private encryption key 114-2 stored at the second trusted computing device 106-2, respectively. The first public encryption key 118-1 and the second public encryption key 118-2 may be transmitted to the user computing device 102, e.g., similar to block 402 in FIG. 4.

The method 600 may proceed when a secret 110 and metadata 148 are combined into a single JavaScript Object Notation (JSON) file by a JSON module 150. In examples, the secret 110 is a seed/mnemonic phrase 201 or a private user key 202, although it could be any data. In examples, the metadata 148 indicates the requirements for reconstituting the secret 110 from the un-encrypted shares 112.

The method 600 may proceed when the JSON file is split (by a Shamir share generator 302) into a first share 112-1 and a second share 112-2, e.g., similar to block 404 in FIG. 4. In examples, the Shamir share generator 302 breaks the secret 110 into shares 112 using polynomial interpolation or Shamir secret sharing. In examples, the shares 112 are Shamir secret shares. In examples, the first share 112-1 and the second share 112-2 are required to reconstruct the secret 110, i.e., M of M shares 112 are required, where M=2. However, in other configurations, M could be any number (e.g., M=3, 4, 5, etc.) and/or only M of N shares would be required (e.g., 2 of 3, 2 of 4, 3 of 4, 3 of 5, etc.). In examples, the metadata 148 indicates how many shares 112 are required to reconstruct the secret 110.

The method 600 may proceed when the shares 112 are encrypted into encrypted shares 120, similar to block 406 in FIG. 4. In examples using ECDH, a private signature key 128 and a respective public encryption key 118 and are provided to the ECDH operation, which produces a respective AES key 136. In other words, a different AES key 136 may be generated for each share 112 using the private signature key 128 (e.g., that is common for all shares 112) and a respective public encryption key 118 (e.g., that is unique to each share 112). Each share 112 is encrypted with a respective AES key 136 to produce a respective encrypted share 120. In examples not using ECDH, each share 112 is asymmetrically encrypted using a different public encryption key 118, resulting in a set of encrypted shares 120. In non-ECDH examples, the encrypted shares 120 may optionally be subsequently signed using the private signature key 128.

The method 600 may proceed when the shares 112 are input into a hashing function 152 to determine respective hashes 112. In examples, the user computing device 102 may use any suitable cryptographic hashing function that produces share hashes 122 from the shares 112, e.g., SHA-256.

The method 600 may proceed when the share hashes 122 and encrypted shares 120 are signed (e.g., in a signing module 154) using the authentication private key 146 to produce a signature 156. The user computing device 102 may send the signature 156 to the remotely located computing device(s) 104.

The method 600 may proceed when remotely located computing device(s) 104 verifies the signature 156 (e.g., in a verification module) using the public signature key 130 previously stored on the remotely located computing device(s) 104. If the signature 156 is verified, the share hashes 122 and encrypted shares 120 are stored at the remotely located computing device(s) 104, e.g., in a cloud-based storage repository in or communicatively coupled to the remotely located computing device(s) 104.

Figure 7:
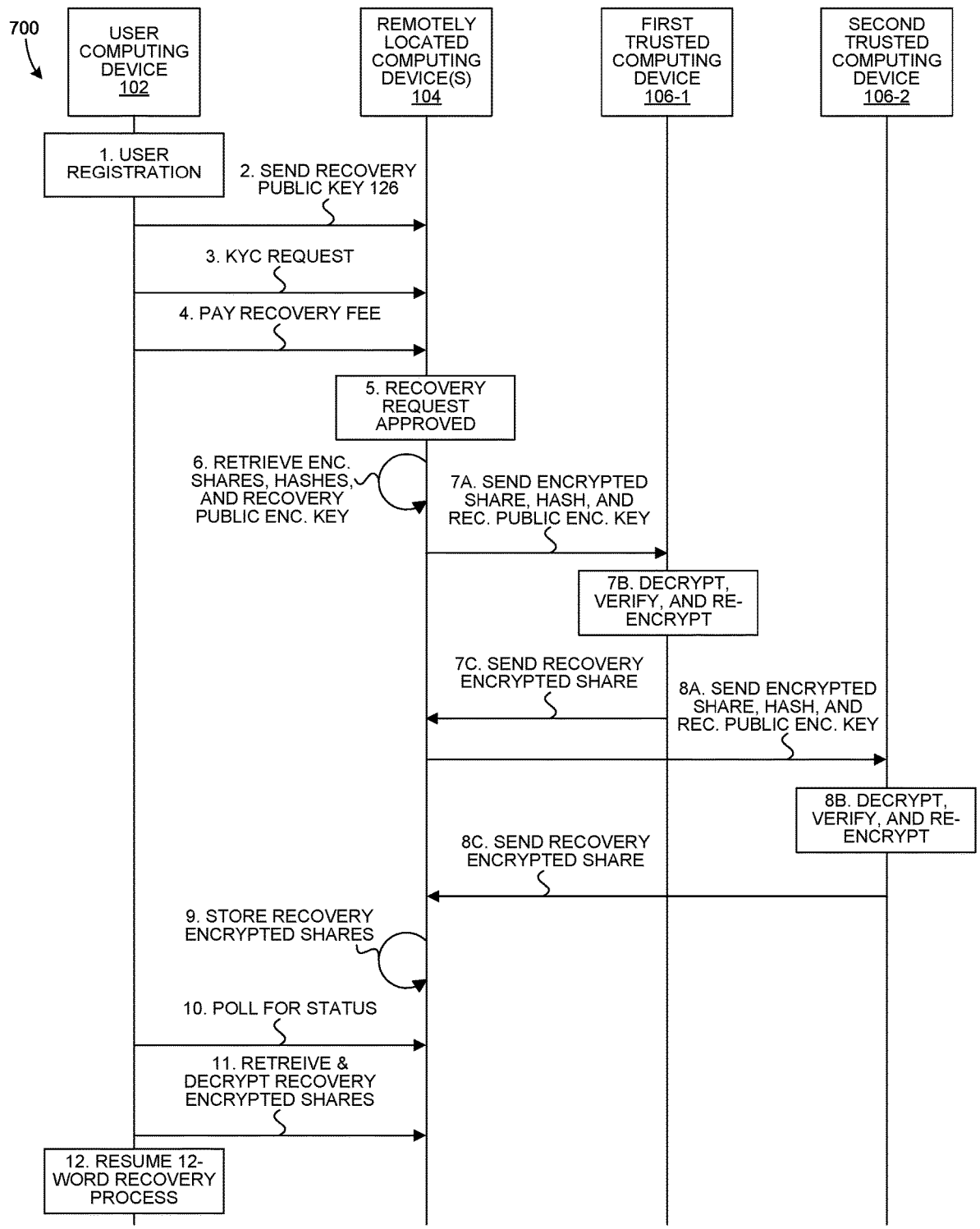
FIG. 7 is a sequence diagram illustrating a method for recovering a secret from a plurality of encrypted shares.

FIG. 7 is a sequence diagram illustrating a method 700 for recovering a secret 110 from the plurality of encrypted secret shares 118, e.g., when the user computing device 102 (and any keys stored thereon) is lost, broken, upgraded or hard reset/reformatted. The method 700 may be performed in a system similar to the systems 100A-B illustrated in FIGS. 1A-B. Specifically, the method 700 may be performed in a system that includes a user computing device 102 (e.g., a smart phone), remotely located computing device(s) 104, a first trusted computing device 106-1, and a second trusted computing device 106-2. It is understood that the method 700 may be performed in systems with more or fewer of any of the devices illustrated in FIG. 7, e.g., more than two trusted computing devices 106. In examples, there may be two different remotely located computing devices 104, a first one at the location of the first trusted computing device 106-1, and a second one at the location of the second trusted computing device 106-2.

In examples, the method 700 of FIG. 7 is performed after the user computing device 102 has split a secret 110, encrypted the shares 112 into encrypted shares 120, and stored the encrypted shares 120 at the remotely located computing device(s) 104, e.g., as described in the method 600 of FIG. 6. In examples, not all the illustrated steps are performed, and/or the steps are performed in a different order.

Additionally, the remotely located computing device(s) 104 (1) communicate with the user computing device 102 via at least one network 108; and (2) include and/or are communicatively coupled to a storage repository, e.g., a cloud-based file storage repository, such as Google Firestore/Firebase. Additionally, the trusted computing devices 106 may be air-gapped devices (e.g., laptops) that can only receive and send data via manually transfer data using a mobile storage device, such as a USB drive.

In a first step, a user registers a recovery account. A recovery account may be used when the private keys for the user's main account were lost, e.g., due to a lost or broken phone. In examples, the registration includes the user entering information into an application running on the user computing device 102. In examples, the user computing device 102 may generate a key pair, e.g., including a recovery public signature key 134 and a recovery private signature key 132. In examples, the trusted computing devices 106 may sign data (e.g., encrypted shares 120 and share hashes 122) that is sent to the remotely located computing device 104 using the recovery private signature key 132, while the recovery public signature key 134 is sent to the remotely located computing device 104 to verify the source of this data.

During registration of the recovery account, the recovery account may be populated with the user's identity data and/or payment data. In examples, the user may enter minimal information for their recovery account, e.g., a few items of identity data. Then, after the recovery request is approved (in the fifth step below), the remaining identity data and/or payment data from the user's main account may be populated in the recovery account. Alternatively, all identity data and/or payment data may be entered during registration of the recovery account. To the extent that identity data and/or payment data is newly-entered during the registration of the recovery account, it may be transmitted to the remotely located computing device(s) 104, e.g., using a secure transfer protocol. Optionally, data sent to the remotely located computing device(s) 104 (during registration of the recovery account) may be signed using the recovery private signature key 132.

In a second step, the user computing device 102 may send a recovery public encryption key 126 to the remotely located computing device(s) 104. The user computing device 102 may generate a recovery encryption key pair including a recovery private decryption key 124 and the recovery public encryption key 126 to be used in encrypting the recovered data. The recovery private decryption key 124 may be stored on the user computing device 102, while the recovery public encryption key 126 (from the user computing device 102) may be further transferred to the trusted computing devices 106, e.g., using at least one mobile storage device.

In a third step, the user computing device(s) 102 may send a know-your-customer (KYC) request to the remotely located computing device(s) 104. In examples, KYC seeks to verify that the user is who they say they are and/or ensure that the user is not on any law enforcement watch lists. KYC may optionally assess credit worthiness (e.g., with a soft credit check), analyze the customer's transactional behavior, and/or monitor the customer's account for fraudulent behavior based on the customer's transaction behavior. In examples, the remotely located computing device(s) 104 may interact with an identity services provider (not shown) to perform KYC. Optionally, an anti-money laundering (AML) check may also be performed for the user. AML seeks to ensure that the customer is not laundering money, i.e., that the customer is not taking steps to obscure the source of funds that were received from illegal or unethical activities.

When the KYC and/or AML procedure is complete, the identity services provider may transmit a notification to the remotely located computing device(s) 104. The notification may indicate the success or failure of the KYC and/or AML procedures for the user. In examples, the remotely located computing device(s) 104 may indicate to the application in the user computing device 102 whether KYC and/or AML checks succeeded.

In a fourth step, the user computing device 102 may send payment (a recovery fee) to the remotely located computing device(s) 104. This payment may take any suitable form: credit card payment, Automated Clearing House (ACH) payments, e-check, cryptocurrency transaction, etc.

In a fifth step, the remotely located computing device(s) 104 may approve the recovery request. This may include verifying that the user of the user computing device 102 has permissions to recover the secret 110. This may occur with data transfer from user computing device 102 across network 108 to the remotely located computing device(s) 104 and/or through other communication between the user and a customer service representative for the operator of the system 100B. In examples, the user must speak with a customer service representative of the system 100B on the telephone before the recovery request is approved.

In a sixth step, the remotely located computing device(s) 104 may retrieve encrypted shares 120, share hashes 122, and a recovery public encryption key 126 from a storage repository. In examples, the encrypted shares 120, share hashes 122, and recovery public encryption key 126 were generated at the user computing device 102 and sent to the remotely located computing device(s) 104 over at least one network 108. In examples, the number of encrypted shares 120 (and share hashes 122) is two (M=2), one for each of the trusted computing devices 106, although M could be more than 2 in some configurations.

In a seventh step, the first encrypted share 120-1 is decrypted and re-encrypted based on the recovery public encryption key 126. Specifically, in step 7A, the first encrypted share 120-1, the first share hash 122-1, and the recovery public encryption key 126 are transferred from the remotely located computing device(s) 104 to the first trusted computing device 106-1, e.g., via manual transfer of data using a mobile storage device, such as a USB drive. In step 7B, the first trusted computing device 106-1 may decrypt the first encrypted share 120-1 (as described in block 506 in FIG. 5); optionally verify that a recovery hash of the unprotected first share 112-1 matches the received first share hash 122-1; and re-encrypt the first share 112-1, based on the recovery public encryption key 126, to produce a first recovery encrypted share 142-1 (as described in block 508 in FIG. 5). In step 7C, the first trusted computing device 106-1 may send the first recovery encrypted share 142-1 to the remotely located computing device(s) 104. In examples, step 7C may include manually transferring data using a mobile storage device, such as a USB drive.

In an eighth step, the second encrypted share 120-2 is decrypted and re-encrypted based on the recovery public encryption key 126. Specifically, in step 8A, the second encrypted share 120-2, the second share hash 122-2, and the recovery public encryption key 126 are transferred from the remotely located computing device(s) 104 to the second trusted computing device 106-2, e.g., via manual transfer of data using a mobile storage device, such as a USB drive. In step 8B, the second trusted computing device 106-2 may decrypt the second encrypted share 120-2 (as described in block 506 in FIG. 5); optionally verify that a recovery hash of the unprotected second share 112-2 matches the received second share hash 122-2; and re-encrypt the second share 112-2, based on the recovery public encryption key 126, to produce a second recovery encrypted share 142-2 (as described in block 508 in FIG. 5). In step 8C, the second trusted computing device 106-2 may send the second recovery encrypted share 142-2 to the remotely located computing device(s) 104. In examples, step 8C may include manually transferring data using a mobile storage device, such as a USB drive.

Although not shown in FIG. 7, more than two trusted computing devices 106 may be used in the method 700, where each trusted computing device 106 (1) receives a respective encrypted share 120 via manual transfer; (2) decrypts, verifies, and re-encrypts into a respective recovery encrypted share 142; after which (3) the recovery encrypted share 142 is manually transferred to the remotely located computing device 104, similar to the seventh and eighth steps.

In a ninth step, the remotely located computing device(s) 104 may store the recovery encrypted shares 142 in the storage repository.

In a tenth step, the user computing device 102 may poll the status of the remotely located computing device 102. This may include periodic messages requesting that the remotely located computing device(s) 104 indicate whether it has received recovery encrypted shares 142 from a sufficient number (e.g., M) of trusted computing devices 106.

In an eleventh step, the user computing device 102 may retrieve and decrypt the recovery encrypted shares 142. The recovery encrypted shares 142 may be retrieved across at least one network 108. The recovery encrypted shares 142 may be decrypted with or without ECDH (e.g., as described in block 512 of FIG. 5). Thereafter, the shares 112 can be used to reconstitute the secret 110, e.g., either a seed/mnemonic phrase 201 or a private user key 202.

In a twelfth step, the user computing device 102 may resume a 12-word recovery process using the recovered secret.

In examples, the devices and systems herein are implemented using memory and/or processors. In examples, the memory can be any device, mechanism, or populated data structure used for storing information. In examples, the memory can be or include any type of volatile memory, nonvolatile memory, and/or dynamic memory. In examples, the memory can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory. The memory may be used to store instructions for running one or more applications or modules on the processor. In examples, the memory could be used in one or more examples to house all or some of the instructions needed to execute the functionality of the any of the systems devices described herein. The processor can be any known processor, such as a general purpose processor (GPP) or special purpose (such as a field-programmable gate array (FPGA), application-specific integrated circuit (ASIC) or other integrated circuit or circuitry), or any programmable logic device.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 8:
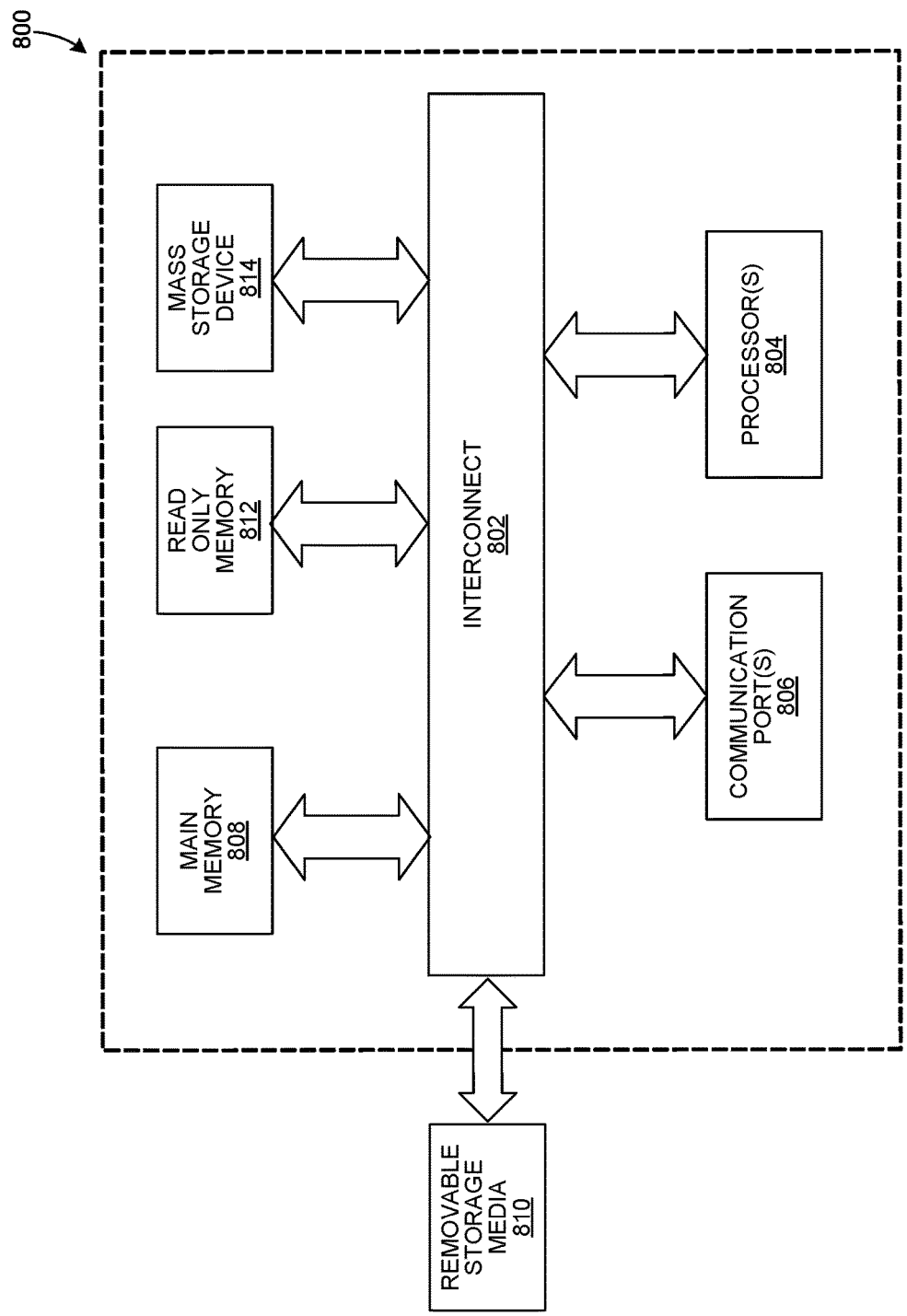
FIG. 8 is a block diagram illustrating an example computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is a block diagram illustrating an example computer system 800 with which embodiments of the present disclosure may be utilized. According to the present example, the computer system 800 includes an interconnect 802, at least one processor 804, at least one communication port 806, at least one main memory 808, at least one mobile storage media 810, at least one read only memory 812, and at least one mass storage device 814.

The at least one processor 804 can be any known processor. The at least one communication port 806 can be or include, for example, any of an RS-232 port for use with a modem-based dialup connection, a 10/100 Ethernet port, or a Gigabit port using copper or fiber. The nature of the at least one communication port 806 may be chosen depending on a network such as a Local Area Network (LAN), Wide Area Network (WAN), or any network to which the computer system 800 connects. The at least one main memory 808 can be Random Access Memory (RAM), or any other dynamic storage device(s) commonly known in the art. The at least one read only memory 812 can be any static storage device(s) such as Programmable Read Only Memory (PROM) chips for storing static information such as instructions for the at least one processor 804.

The at least one mass storage device 814 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 802 can be or include one or more buses, bridges, controllers, adapters, and/or point-to-point connections. Interconnect 802 communicatively couples the at least one processor 804 with the other memory, storage, and communication blocks. Interconnect 802 can be a PCI/PCI-X or SCSI based system bus depending on the storage devices used. The at least one mobile storage media 810 can be any kind of external hard-drives, floppy drives, Compact Disc-Read Only Memory (CD-ROM), Compact Disc-ReWritable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Figure 9:
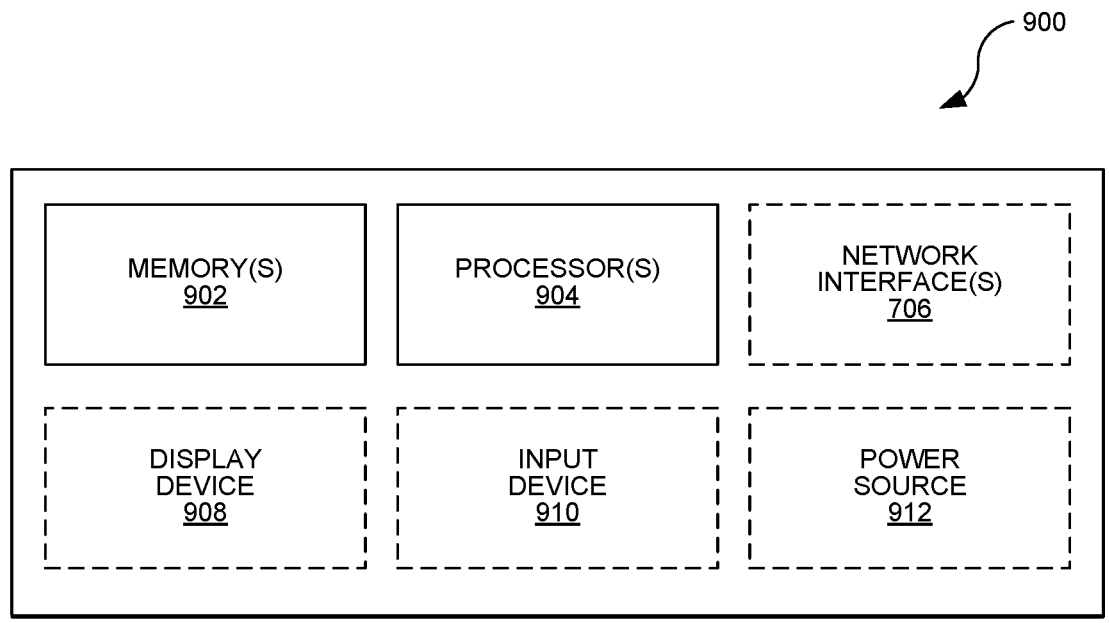
FIG. 9 is a block diagram illustrating another example computing device.

FIG. 9 is a block diagram illustrating another example computing device 900. The example computing device 900 may be used to implement any of the user computing device 102, the remotely located computing device(s) 104, the trusted computing device 106, the asset exchange the identity services provider, the vault systems 1250, and/or the optional record keeping system 1252. The computing device 900 includes at least one memory 902, at least one processor 904, optional at least one network interface 906, optional display device 908, optional input device 910, and optional power source 912.

In examples, the at least one memory 902 can be any device, mechanism, or populated data structure used for storing information. In examples, the at least one memory 902 can be or include any type of volatile memory, nonvolatile memory, and/or dynamic memory. In examples, the at least one memory 902 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 902 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 902. The at least one memory 902 may be used to store instructions for running one or more applications or modules on the at least one processor 904. In examples, the at least one memory 902 could be used in one or more examples to house all or some of the instructions needed to execute the functionality discussed herein, e.g., in FIGS. 3-4 and 6-10.

The at least one processor 904 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein may be implemented by the at least one processor 904 and the at least one memory 902.

In examples, the at least one optional network interface 906 includes or is coupled to at least one optional antenna for communication with a network (such as one of the at least one networks 108 of system 100). In examples, the at least one optional network interface 906 includes at least one of an Ethernet interface, a cellular radio access technology (RAT) radio, a Wi-Fi radio, a Bluetooth radio, or a near field communication (NFC) radio. In examples, the at least one optional network interface 906 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 906 includes a Wi-Fi (IEEE 802.11) radio configured to communicate with a wireless local area network that communicates with the remote server, rather than a wide area network. In examples, the at least one optional network interface 906 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 908 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 910 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 908 is combined with the optional at least one input device 910 into a human machine interface (HMI) for user interaction with the user computing device 102, the remotely located computing device(s) 104, and/or the trusted computing device 106. In examples, at least one optional power source 912 is used to provide power to the various components of the computing device 900.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

In conclusion, the present disclosure provides a novel multi-approval system using M of N keys to perform an action at a customer device and associated methods. While detailed descriptions of one or more embodiments of the disclosure have been given above, various alternatives, modifications, and equivalents will be apparent to those skilled in the art without varying from the spirit of the disclosure. In examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a user computing device comprising: at least one processor; at least one memory communicatively coupled to the at least one processor; at least one network interface communicatively coupled to the at least one processor and configured to communicate with at least one remotely located computing device; wherein the at least one network interface is configured to receive a plurality of public encryption keys from the at least one remotely located computing device; wherein the at least one processor is configured to: split at least one secret into a plurality of shares, wherein at least a subset of the plurality of shares is sufficient to reconstruct the at least one secret; and encrypt each of the plurality of shares based on a different public encryption key of the plurality of public encryption keys to create a plurality of encrypted shares; wherein the at least one network interface is configured to communicate the encrypted shares to the at least one remotely located computing device.

Example 2 includes the user computing device of Example 1, wherein the at least one processor is further configured to encrypt and sign each of the plurality of encrypted shares using an Elliptic Curve Diffie Hellman (ECDH) operation.

Example 3 includes the user computing device of any of Examples 1-2, wherein the at least one processor is configured to encrypt using an Elliptic Curve Diffie Hellman (ECDH) operation, comprising: determining a plurality of ECDH keys, each determined based on a private signature key and a respective one of the public encryption keys; determining a plurality of Advanced Encryption Standard (AES) keys, each determined as a hash of a respective ECDH key, a public signature key, and a respective one of the public encryption keys; and encrypting each of the plurality of shares, combined with a respective AES key, into a respective encrypted share.

Example 4 includes the user computing device of any of Examples 1-3, wherein each different public encryption key of the plurality of public encryption keys is derived using a Hierarchical Deterministic (HD) methodology from a different master seed key.

Example 5 includes the user computing device of any of Examples 1-4, wherein the shares are Shamir secret shares.

Example 6 includes the user computing device of any of Examples 1-5, wherein the at least one processor is configured to split the at least one secret into a plurality of shares through at least one of polynomial interpolation or Shamir secret sharing.

Example 7 includes the user computing device of any of Examples 1-6, wherein the shares are Shamir shares; and wherein the at least one processor is configured to split the at least one secret into a plurality of shares using Shamir secret sharing.

Example 8 includes the user computing device of any of Examples 1-7, wherein the at least one secret includes at least one of: a key, a cryptographic key, a private key, a public encryption key, an encryption key, a signature key, and a password.

Example 9 includes the user computing device of any of Examples 1-8, wherein the at least one secret can be used to encrypt data, decrypt data, and sign transactions.

Example 10 includes the user computing device of any of Examples 1-9, wherein the plurality of public encryption keys are each part of a different encryption key pair with a different private key, each different private key stored on a different computing device.

Example 11 includes the user computing device of Example 10, wherein each different computing device is controlled by a different group of individuals.

Example 12 includes the user computing device of any of Examples 10-11, wherein each different computing device is located at a different physical location from other different computing devices.

Example 13 includes the user computing device of any of Examples 1-12, wherein the at least one network interface is configured to receive at least a first subset of a first plurality of encrypted shares from the at least one remotely located computing device; wherein the at least one processor is configured to: decrypt each of the first subset of the first plurality of encrypted shares to create a first plurality of un-encrypted shares; and reconstruct the at least one secret using the first plurality of un-encrypted shares.

Example 14 includes the user computing device of Example 13, wherein the at least one network interface is configured to communicate at least one recovery public encryption key to the at least one remotely located computing device; wherein the at least one processor is configured to decrypt each of the first subset of the first plurality of encrypted shares based on at least one recovery private decryption key corresponding to the at least one recovery public encryption key.

Example 15 includes the user computing device of Example 14, wherein each different recovery public encryption key of the at least one recovery public encryption key is part of a different recovery encryption key pair with a different recovery private decryption key of the at least one recovery private decryption key.

Example 16 includes the user computing device of any of Examples 14-15, wherein the at least one recovery private decryption key is a single recovery private decryption key; and wherein the at least one recovery public encryption key is a single recovery public encryption key.

Example 17 includes the user computing device of any of Examples 14-16, wherein the at least one processor is further configured to generate a hash from each of the plurality of shares prior to encryption; and wherein the at least one network interface is further configured to communicate the hashes to the at least one remotely located computing device.

Example 18 includes a user computing device comprising: at least one processor; at least one memory communicatively coupled to the at least one processor; at least one network interface communicatively coupled to the at least one processor and configured to communicate with at least one remotely located computing device; wherein the at least one network interface is configured to communicate at least one recovery public encryption key to at least one remotely located computing device, wherein at least one recovery private decryption key corresponds to the at least one recovery public encryption key; wherein the at least one network interface is configured to receive at least a subset of a first plurality of encrypted shares from the at least one remotely located computing device; wherein the at least one processor is configured to: decrypt each of the subset of the first plurality of recovery encrypted shares to create a first plurality of un-encrypted shares based on the at least one recovery private decryption key corresponding to the at least one recovery public encryption key; reconstruct the at least one secret using the first plurality of un-encrypted shares.

Example 19 includes the user computing device of Example 18, wherein the at least one recovery private decryption key is a single recovery private decryption key; and wherein the at least one recovery public encryption key is a single recovery public encryption key.

Example 20 includes the user computing device of any of Examples 18-19, wherein the un-encrypted shares are Shamir secret shares.

Example 21 includes the user computing device of any of Examples 18-20, wherein the at least one processor is configured to reconstruct the at least one secret using the first plurality of un-encrypted shares through at least one of polynomial interpolation or Shamir secret sharing.

Example 22 includes the user computing device of any of Examples 18-21, wherein the un-encrypted shares are Shamir shares; and wherein the at least one processor is configured to reconstruct the at least one secret using the second plurality of shares using Shamir secret sharing.

Example 23 includes the user computing device of any of Examples 18-22, wherein the at least one secret includes at least one of: a key, a cryptographic keys, a private key, a public encryption key, an encryption key, a signature key, and a password.

Example 24 includes the user computing device of any of Examples 18-23, wherein the at least one secret can be used to encrypt data, decrypt data, and sign transactions.

Example 25 includes the user computing device of any of Examples 18-24, wherein each different recovery public encryption key of the at least one recovery public encryption key is part of a different recovery encryption key pair with a different recovery private decryption key of the at least one recovery private decryption key.

Example 26 includes the user computing device of any of Examples 18-25, wherein the at least one processor is configured to decrypt using an Elliptic Curve Diffie Hellman (ECDH) operation, comprising: determining at least one recovery ECDH key, each determined based on a respective recovery public signature key and a respective one of the at least one recovery private decryption key; for each recovery ECDH key, determining an Advanced Encryption Standard (AES) key as a hash of the respective recovery ECDH key, a respective recovery public signature key, and a respective one of the at least one recovery public encryption key; and decrypt each of the subset of the first plurality of recovery encrypted shares, combined with a corresponding recovery AES key, into a respective un-encrypted share.

Example 27 includes a system comprising: a first user computing device; and at least one remotely located computing device configured to communicate with the first user computing device; wherein the at least one remotely located computing device is configured to communicate a plurality of public encryption keys to the first user computing device; wherein the first user computing device is configured to: split at least one secret into a plurality of shares, wherein at least a subset of the plurality of shares is sufficient to reconstruct the at least one secret; encrypt each of the plurality of shares based on a different public encryption key of the plurality of public encryption keys to create a plurality of encrypted shares; and communicate the encrypted shares to the at least one remotely located computing device; and wherein the at least one remotely located computing device is configured to store the encrypted shares.

Example 28 includes the system of Example 27, wherein the at least one processor is further configured to sign each of the plurality of encrypted shares using a private signature key.

Example 29 includes the system of any of Examples 27-28, wherein the at least one processor is configured to encrypt using an Elliptic Curve Diffie Hellman (ECDH) operation, comprising: determining a plurality of ECDH keys, each determined based on a private signature key and a respective one of the plurality of public encryption keys; determining a plurality of Advanced Encryption Standard (AES) keys, each determined as a hash of a respective ECDH key, a public signature key, and a respective one of the plurality of public encryption keys; and encrypting each of the plurality of shares, along with a respective AES key, into a respective one of the plurality of encrypted shares.

Example 30 includes the system of any of Examples 27-29, wherein each different public encryption key of the plurality of public encryption keys is derived using a Hierarchical Deterministic (HD) methodology from a different master seed key.

Example 31 includes the system of any of Examples 27-30, wherein the shares are Shamir secret shares.

Example 32 includes the system of any of Examples 27-31, wherein the first user computing device is configured to split the at least one secret into a plurality of shares through at least one of polynomial interpolation or Shamir secret sharing.

Example 33 includes the system of any of Examples 27-32, wherein the shares are Shamir shares; and wherein the first user computing device is configured to split the at least one secret into a plurality of shares using Shamir secret sharing.

Example 34 includes the system of any of Examples 27-33, wherein the at least one secret includes at least one of: a key, a cryptographic key, a private key, a public encryption key, an encryption key, a signature key, and a password.

Example 35 includes the system of any of Examples 27-34, wherein the at least one secret can be used to encrypt data, decrypt data, and sign transactions.

Example 36 includes the system of any of Examples 27-35, wherein the plurality of public encryption keys are each part of a different encryption key pair with a different private key, each different private key stored on a different computing device.

Example 37 includes the system of Example 36, wherein each different computing device is controlled by a different group of individuals.

Example 38 includes the system of any of Examples 36-37, wherein each different computing device is located at a different physical location from other different computing devices.

Example 39 includes the system of any of Examples 29-38, further comprising: a second user computing device; wherein the second user computing device is configured to communicate at least one recovery public encryption key to the at least one remotely located computing device; wherein the at least one remotely located computing device is configured to communicate at least one recovery encrypted share to the second user computing device; wherein the second user computing device is configured to decrypt each of the at least one recovery encrypted share to create a first plurality of un-encrypted shares based on at least one recovery private decryption key corresponding to the at least one recovery public encryption key; and wherein the second user computing device is configured to reconstruct the at least one secret using the first plurality of un-encrypted shares.

Example 40 includes the system of Example 39, wherein each different recovery public encryption key of the at least one recovery public encryption key is part of a different recovery encryption key pair with a different recovery private decryption key of the at least one recovery private decryption key.

Example 41 includes the system of any of Examples 39-40, wherein the at least one recovery private decryption key is a single recovery private decryption key; and wherein the at least one recovery public encryption key is a single recovery public encryption key.

Example 42 includes the system of Example 41, wherein the second computing device is configured to decrypt using an Elliptic Curve Diffie Hellman (ECDH) operation, comprising: determining at least one recovery ECDH key, each determined based on a respective recovery public signature key and a respective one of the at least one recovery private decryption key; for each recovery ECDH key, determining an Advanced Encryption Standard (AES) key as a hash of the respective recovery ECDH key, a respective recovery public signature key, and a respective recovery public encryption key; and decrypt each of the at least one recovery encrypted share, combined with a corresponding recovery AES key, into a respective one of the first plurality of un-encrypted shares.

Example 43 includes a system comprising: a user computing device; and at least one remotely located computing device configured to communicate with the first user computing device; wherein the user computing device is configured to communicate at least one recovery public encryption key to at least one remotely located computing device, wherein at least one recovery private decryption key corresponds to the at least one recovery public encryption key; wherein the at least one remotely located computing device is configured to communicate at least a subset of a first plurality of recovery encrypted shares to the user computing device; wherein the user computing device is configured to: decrypt each of the subset of the first plurality of recovery encrypted shares to create a first plurality of un-encrypted shares based on the at least one recovery private decryption key corresponding to the at least one recovery public encryption key; and reconstruct the at least one secret using the first plurality of un-encrypted shares.

Example 44 includes the system of Example 43, wherein the at least one recovery private decryption key is a single recovery private decryption key; and wherein the at least one recovery public encryption key is a single recovery public encryption key.

Example 45 includes the system of any of Examples 43-44, wherein the un-encrypted shares are Shamir secret shares.

Example 46 includes the system of any of Examples 43-45, wherein the at least one processor is configured to reconstruct the at least one secret using the first plurality of un-encrypted shares through at least one of polynomial interpolation or Shamir secret sharing.

Example 47 includes the system of any of Examples 43-46, wherein the un-encrypted shares are Shamir shares; and wherein the at least one processor is configured to reconstruct the at least one secret using the second plurality of shares using Shamir secret sharing.

Example 48 includes the system of any of Examples 43-47, wherein the at least one secret includes at least one of: a key, a cryptographic keys, a private key, a public encryption key, an encryption key, a signature key, and a password.

Example 49 includes the system of any of Examples 43-48, wherein the at least one secret can be used to encrypt data, decrypt data, and sign transactions.

Example 50 includes the system of any of Examples 43-49, wherein each different recovery public encryption key of the at least one recovery public encryption key is part of a different recovery encryption key pair with a different recovery private decryption key of the at least one recovery private decryption key.

Example 51 includes the system of any of Examples 43-50, wherein the user computing device is configured to decrypt using an Elliptic Curve Diffie Hellman (ECDH) operation, comprising: determining at least one recovery ECDH key, each determined based on a respective recovery public signature key and a respective one of the at least one recovery private decryption key; for each recovery ECDH key, determining an Advanced Encryption Standard (AES) key as a hash of the respective recovery ECDH key, a respective recovery public signature key, and a respective one of the at least one recovery public encryption key; and decrypt each of the subset of the first plurality of recovery encrypted shares, combined with a corresponding recovery AES key, into a respective un-encrypted share.

Example 52 includes a computerized method comprising: communicating a plurality of public encryption keys from at least one remotely located computing device to a first user computing device; splitting at least one secret into a plurality of shares at the first user computing device, wherein at least a subset of the plurality of shares is sufficient to reconstruct the at least one secret; encrypting each of the plurality of shares based on a different public encryption key of the plurality of public encryption keys at the first user computing device to create a plurality of encrypted shares; communicating the encrypted shares from the first user computing device to the at least one remotely located computing device; and storing the encrypted shares at the at least one remotely located computing device.

Example 53 includes the computerized method of Example 52, further comprising transferring, via at least one mobile storage device, each of the plurality of encrypted shares from the at least one remotely located computing device to a respective one of a plurality of trusted computing devices; decrypting, at each trusted computing device, a respective encrypted share into a respective un-encrypted share; and verifying, at each trusted computing device, that a respective un-encrypted share matches one of the plurality of shares before it was encrypted.

Example 54 includes the computerized method of Example 53, wherein decrypting comprises using an Elliptic Curve Diffie Hellman (ECDH) operation, comprising: determining at least one ECDH key, each determined based on a public signature key and a respective one of the at least one private decryption key; for each recovery ECDH key, determining an Advanced Encryption Standard (AES) key as a hash of the respective ECDH key, the public signature key, and a respective one of the at least one public encryption key; and decrypt each encrypted share, combined with a corresponding recovery AES key, into a respective un-encrypted share.

Example 55 includes the computerized method of any of Examples 53-54, further comprising: generating, at the first user computing device, a hash of each of the first plurality of shares; communicating the hashes of the first plurality of shares to the at least one remotely located computing device; transferring each of the hashes from the at least one remotely located computing device to a respective one of the plurality of trusted computing devices; and generating a recovery hash from each of the un-encrypted shares; wherein the verifying comprises comparing the hashes with the recovery hashes to determine whether data in the un-encrypted shares is accurate.

Example 56 includes the computerized method of Example 55, further comprising: re-encrypting the un-encrypted shares into recovery encrypted shares; transferring the un-encrypted shares to the at least one remotely located computing device; communicating the recovery encrypted shares to a second user computing device from the at least one remotely located computing device; decrypting each of the recovery encrypted shares at the second user computing device to create a plurality of decrypted shares; and reconstructing the at least one secret at the second user computing device using the plurality of decrypted shares.

Example 57 includes the computerized method of any of Examples 55-56, wherein re-encrypting comprises using an Elliptic Curve Diffie Hellman (ECDH) operation, comprising: determining a plurality of recovery ECDH keys, each determined based on a respective recovery private signature key and a respective recovery public encryption key; determining a plurality of Advanced Encryption Standard (AES) keys, each determined as a hash of a respective recovery ECDH key, a respective recovery public signature key, and a respective recovery public encryption key; and encrypting each of the un-encrypted shares, along with a respective AES key, into a respective one of the recovery encrypted shares.

Example 58 includes a computerized method comprising: communicating at least one recovery public encryption key to at least one remotely located computing device from a user computing device, wherein at least one recovery private decryption key corresponds to the at least one recovery public encryption key; communicating at least a subset of a first plurality of recovery encrypted shares to the user computing device from the at least one remotely located computing device; decrypting each of the subset of the first plurality of recovery encrypted shares at the user computing device to create a first plurality of un-encrypted shares based on the at least one recovery private decryption key corresponding to the at least one recovery public encryption key; and reconstructing the at least one secret at the user computing device using the first plurality of un-encrypted shares.

Example 59 includes the computerized method of Example 58, further comprising: encrypting a first plurality of shares at one or more trusted computing devices based on the at least one recovery public encryption key into the at least a subset of the first plurality of recovery encrypted shares prior to communicating the subset of the first plurality of recovery encrypted shares to the user computing device from the at least one remotely located computing device.

Example 60 includes the computerized method of Example 59, wherein encrypting comprises using an Elliptic Curve Diffie Hellman (ECDH) operation, comprising: determining a plurality of recovery ECDH keys, each determined based on a respective recovery private signature key and a respective recovery public encryption key; determining a plurality of Advanced Encryption Standard (AES) keys, each determined as a hash of a respective recovery ECDH key, a respective recovery public signature key, and a respective recovery public encryption key; and encrypting each of the plurality of un-encrypted shares, along with a respective AES key, into a respective one of the first plurality of recovery encrypted shares.

Example 61 includes the computerized method of any of Examples 58-60, wherein decrypting comprises using an Elliptic Curve Diffie Hellman (ECDH) operation, comprising: determining at least one recovery ECDH key, each determined based on a respective recovery public signature key and one of the at least one recovery private decryption key; for each recovery ECDH key, determining an Advanced Encryption Standard (AES) key as a hash of the respective recovery ECDH key, a respective recovery public signature key, and one of the at least one recovery public encryption key; and decrypt each of the subset of the first plurality of recovery encrypted shares, combined with a corresponding recovery AES key, into a respective un-encrypted share.

The invention claimed is:
1. A system comprising:
a first user computing device having a first memory and a first at least one processor; and
at least one remotely located computing device having a second memory and a second at least one processor, wherein the at least one remotely located computing device is configured to communicate with the first user computing device;
a plurality of trusted computing devices, each of the plurality of trusted computing devices having a respective memory and a respective at least one processor;
wherein the at least one remotely located computing device is configured to communicate a plurality of public encryption keys to the first user computing device;
wherein the first user computing device is configured to:
split at least one secret into a plurality of shares, wherein at least a subset of the plurality of shares is sufficient to reconstruct the at least one secret;
generate a respective hash for each respective share of the plurality of shares;
encrypt each of the plurality of shares based on a different public encryption key of the plurality of public encryption keys to create a plurality of encrypted shares; and
communicate the plurality of encrypted shares and the respective hash for each respective share of the plurality of shares to the at least one remotely located computing device; and wherein the at least one remotely located computing
device is configured to:
store the plurality of encrypted shares;
transfer, via at least one mobile storage device, each respective encrypted share of the plurality of encrypted shares to a respective trusted computing device of the plurality of trusted computing devices;
transfer each respective hash for each respective share of the plurality of shares to a respective trusted computing device of the plurality of trusted computing devices;
wherein each of the plurality of trusted computing devices is configured to:
decrypt a respective encrypted share into a respective un-encrypted share;
generate a respective recovery hash from the respective un-encrypted share; and
verify that the respective un-encrypted share matches one of the plurality of shares before it was encrypted at least in part by comparing the respective hash with the respective recovery hash to determine whether data in the respective un-encrypted share is accurate.

2. The system of claim 1, wherein the first at least one processor is further configured to sign each of the plurality of encrypted shares using a private signature key.

3. The system of claim 1, wherein the first at least one processor is configured to encrypt using an Elliptic Curve Diffie Hellman (ECDH) operation, comprising:
determining a plurality of ECDH keys, each determined based on a private signature key and a respective public encryption key of the plurality of public encryption keys;
determining a plurality of Advanced Encryption Standard (AES) keys, each determined as a hash of a respective ECDH key, a public signature key, and the respective public encryption key of the plurality of public encryption keys; and
encrypting each of the plurality of shares, along with a respective AES key, into a respective encrypted share of the plurality of encrypted shares.

4. The system of claim 1, wherein each different public encryption key of the plurality of public encryption keys is derived using a Hierarchical Deterministic (HD) methodology from a different master seed key.

5. The system of claim 1, wherein the plurality of shares are Shamir secret shares.

6. The system of claim 1, wherein the first user computing device is configured to split the at least one secret into the plurality of shares through at least one of polynomial interpolation or Shamir secret sharing.

7. The system of claim 1, wherein the plurality of shares are Shamir secret shares; and
wherein the first user computing device is configured to split the at least one secret into the plurality of shares using Shamir secret sharing.

8. The system of claim 1, wherein the at least one secret includes at least one of: a key, a cryptographic key, a private key, a public encryption key, an encryption key, a signature key, and a password.

9. The system of claim 1, wherein the at least one secret is used to encrypt data, decrypt data, and sign transactions.

10. The system of claim 1, wherein the plurality of public encryption keys are each part of a different encryption key pair with a different private key, each different private key stored on a different computing device.

11. The system of claim 10, wherein each different computing device is controlled by a different group of individuals.

12. The system of claim 10, wherein each different computing device is located at a different physical location from other different computing devices.

13. The system of claim 3, further comprising:
a second user computing device, the second user computing device having a third memory and a third at least one processor;
wherein the second user computing device is configured to communicate at least one recovery public encryption key to the at least one remotely located computing device;
wherein the at least one remotely located computing device is configured to communicate at least one recovery encrypted share to the second user computing device;
wherein the second user computing device is configured to decrypt each of the at least one recovery encrypted share to create a first plurality of un-encrypted shares based on at least one recovery private decryption key corresponding to the at least one recovery public encryption key; and
wherein the second user computing device is configured to reconstruct the at least one secret using the first plurality of un-encrypted shares.

14. The system of claim 13, wherein each different recovery public encryption key of the at least one recovery public encryption key is part of a different recovery encryption key pair with a different recovery private decryption key of the at least one recovery private decryption key.

15. The system of claim 13, wherein the at least one recovery private decryption key is a single recovery private decryption key; and
wherein the at least one recovery public encryption key is a single recovery public encryption key.

16. The system of claim 15, wherein each of the plurality of trusted computing devices is configured to decrypt using an Elliptic Curve Diffie Hellman (ECDH) operation, comprising:
determining at least one recovery ECDH key, each determined based on a respective recovery public signature key and a respective one of the at least one recovery private decryption key;
for each respective recovery ECDH key of the at least one recovery ECDH key, determining an Advanced Encryption Standard (AES) key as a hash of the respective recovery ECDH key, the respective recovery public signature key, and a respective recovery public encryption key; and
decrypt each of the at least one recovery encrypted share, combined with a corresponding recovery AES key, into a respective one of the first plurality of un-encrypted shares.

17. A computerized method comprising:
communicating a plurality of public encryption keys from at least one remotely located computing device to a first user computing device;
splitting at least one secret into a plurality of shares at the first user computing device, wherein at least a subset of the plurality of shares is sufficient to reconstruct the at least one secret;
generating, at the first user computing device, a respective hash for each respective share of the plurality of shares;
encrypting each of the plurality of shares based on a different public encryption key of the plurality of public encryption keys at the first user computing device to create a plurality of encrypted shares;

communicating the plurality of encrypted shares from the first user computing device to the at least one remotely located computing device; and communicating the respective hash for each respective share of the plurality of shares to the at least one remotely located computing device;

storing the plurality of encrypted shares at the at least one remotely located computing device;

transferring, via at least one mobile storage device, each of the plurality of encrypted shares from the at least one remotely located computing device to a respective one of a plurality of trusted computing devices;

transferring each respective hash for each respective share of the plurality of shares from the at least one remotely located computing device to a respective trusted computing device of the plurality of trusted computing devices;

decrypting, at each trusted computing device, a respective encrypted share into a respective un-encrypted share;

generating, at each trusted computing device, a respective recovery hash from the respective un-encrypted share; and verifying, at each trusted computing device, that the respective un-encrypted share matches one of the plurality of shares before it was encrypted at least in part by comparing the respective hash with the respective recovery hash to determine whether data in the respective un-encrypted share is accurate.

18. The computerized method of claim 17, wherein decrypting comprises using an Elliptic Curve Diffie Hellman (ECDH) operation, comprising:

determining at least one recovery ECDH key, each determined based on a respective recovery public signature key and at least one recovery private decryption key;

for each respective recovery ECDH key of the at least one recovery ECDH key, determining an Advanced Encryption Standard (AES) key as a hash of the respective recovery ECDH key, the respective recovery public signature key, and a respective recovery public encryption key; and decrypt each encrypted share, combined with a corresponding recovery AES key, into the respective un-encrypted share.

19. The computerized method of claim 17, further comprising:

re-encrypting un-encrypted shares into recovery encrypted shares;

transferring the un-encrypted shares to the at least one remotely located computing device;

communicating the recovery encrypted shares to a second user computing device from the at least one remotely located computing device;

decrypting each of the recovery encrypted shares at the second user computing device to create a plurality of decrypted shares; and reconstructing the at least one secret at the second user computing device using the plurality of decrypted shares.

20. The computerized method of claim 19, wherein re-encrypting comprises using an Elliptic Curve Diffie Hellman (ECDH) operation, comprising:

determining a plurality of recovery ECDH keys, each determined based on a respective recovery private signature key and a respective recovery public encryption key;

determining a plurality of Advanced Encryption Standard (AES) keys, each determined as a hash of a respective recovery ECDH key, a respective recovery public signature key, and the respective recovery public encryption key; and encrypting each of the un-encrypted shares, along with a respective AES key, into a respective recovery encrypted share of the recovery encrypted shares.

* * * * *